United States Patent
Takahashi et al.

(10) Patent No.: US 9,715,631 B2
(45) Date of Patent: Jul. 25, 2017

(54) BIRDS-EYE-VIEW IMAGE GENERATION DEVICE, AND BIRDS-EYE-VIEW IMAGE GENERATION METHOD

(71) Applicant: PANASONIC CORPORATION, Osaka (JP)

(72) Inventors: Koji Takahashi, Kanagawa (JP); Tadao Ichinose, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 485 days.

(21) Appl. No.: 14/015,735

(22) Filed: Aug. 30, 2013

(65) Prior Publication Data
US 2014/0002660 A1 Jan. 2, 2014

Related U.S. Application Data

(63) Continuation of application No. PCT/JP2012/005923, filed on Sep. 14, 2012.

(30) Foreign Application Priority Data

Sep. 30, 2011 (JP) .................................. 2011-217954

(51) Int. Cl.
*G06K 9/00* (2006.01)
*B60R 1/00* (2006.01)
(Continued)

(52) U.S. Cl.
CPC ............ *G06K 9/00791* (2013.01); *B60R 1/00* (2013.01); *G06K 9/00805* (2013.01);
(Continued)

(58) Field of Classification Search
CPC ............ G06K 9/00791; G06K 9/00624; B60R 1/002; B60R 1/04; B60R 1/06
(Continued)

(56) References Cited

U.S. PATENT DOCUMENTS

2002/0047901 A1 4/2002 Nobori et al.
2004/0184638 A1 9/2004 Nobori et al.
(Continued)

FOREIGN PATENT DOCUMENTS

EP 2 192 552 A1 6/2010
JP 2002-027448 A 1/2002
(Continued)

OTHER PUBLICATIONS

International Search Report issued in PCT/JP2012/005923 with Dated of mailing Dec. 11, 2012.
(Continued)

*Primary Examiner* — Mohammad Rahaman
*Assistant Examiner* — Jimmy S Lee
(74) *Attorney, Agent, or Firm* — McDermott Will & Emery LLP

(57) ABSTRACT

A birds-eye-view image generation device includes a captured image acquisition unit, an image conversion unit, a birds-eye-view image combining unit, and a joint setting unit. The joint setting unit sets any position of a rim of a vehicle image corresponding to a vehicle included in the birds-eye-view image as an end point in an overlapping imaging range in two birds-eye-view images corresponding to two imaging devices of which imaging ranges overlap each other, and sets a line which extends in any direction on an opposite side to the vehicle image from the end point between two radial directions directed to the end point from the two imaging devices, as a joint which joins two birds-eye-view images which are combined.

10 Claims, 25 Drawing Sheets

(51) Int. Cl.
*G06T 3/40* (2006.01)
*G06K 9/20* (2006.01)

(52) U.S. Cl.
CPC ...... *G06T 3/4038* (2013.01); *B60R 2300/607* (2013.01); *G06K 2009/2045* (2013.01)

(58) Field of Classification Search
USPC ......................................................... 348/148
See application file for complete search history.

(56) References Cited

U.S. PATENT DOCUMENTS

| | | | |
|---|---|---|---|
| 2006/0088190 A1* | 4/2006 | Chinomi | B60R 1/00 382/104 |
| 2006/0203092 A1 | 9/2006 | Nobori et al. | |
| 2008/0012940 A1 | 1/2008 | Kanaoka et al. | |
| 2009/0128630 A1 | 5/2009 | Kanaoka et al. | |
| 2010/0134325 A1 | 6/2010 | Gomi et al. | |
| 2010/0220190 A1* | 9/2010 | Hiroshi | B60R 1/00 348/148 |
| 2011/0234801 A1* | 9/2011 | Yamada | B60R 1/00 348/148 |
| 2012/0170812 A1 | 7/2012 | Kamiyama | |

FOREIGN PATENT DOCUMENTS

| | | |
|---|---|---|
| JP | 2007-036668 A | 2/2007 |
| JP | 2007-041791 A | 2/2007 |
| JP | 2008-033901 A | 2/2008 |
| JP | 2010-200240 A | 9/2010 |
| WO | 2011036892 A1 | 3/2011 |

OTHER PUBLICATIONS

Extended European Search Report issued in corresponding European Patent Application No. 12834713.5, mailed on May 18, 2015; 7 pages.

* cited by examiner

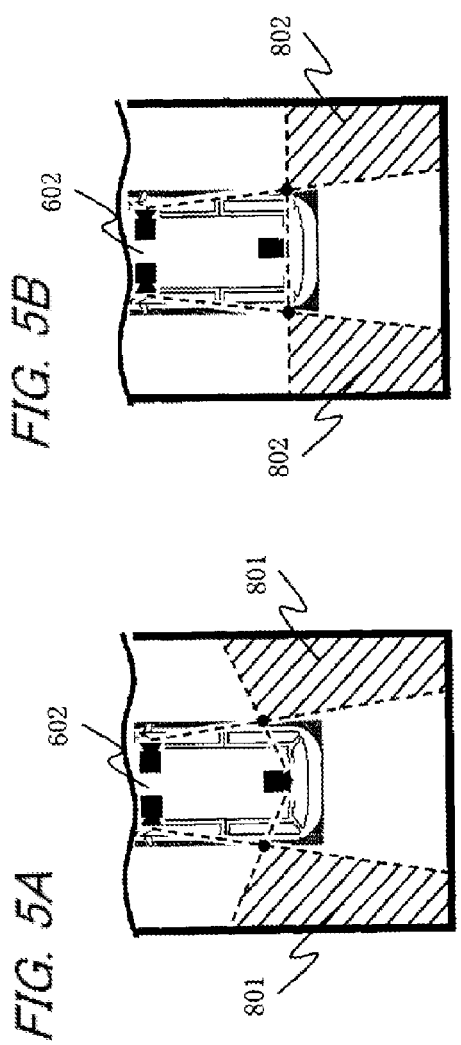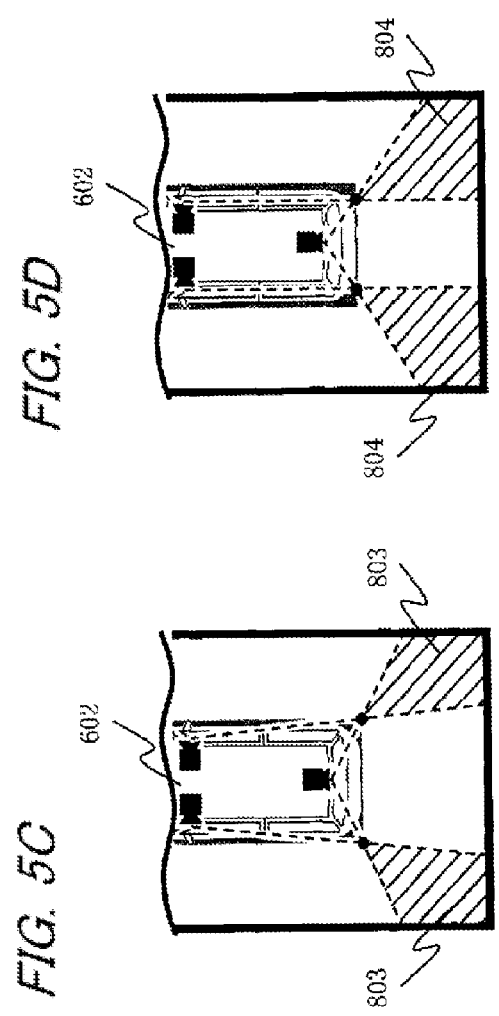

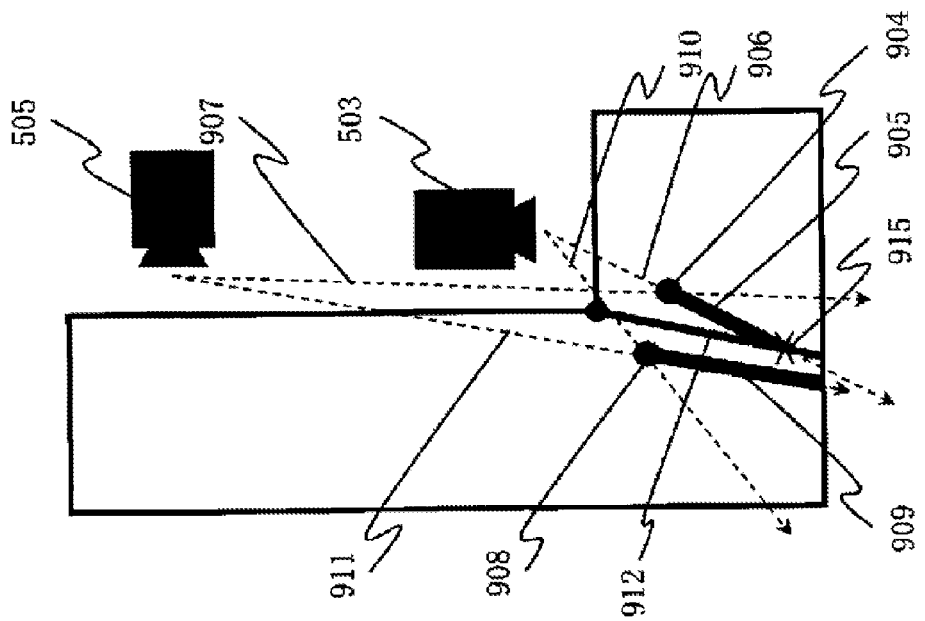
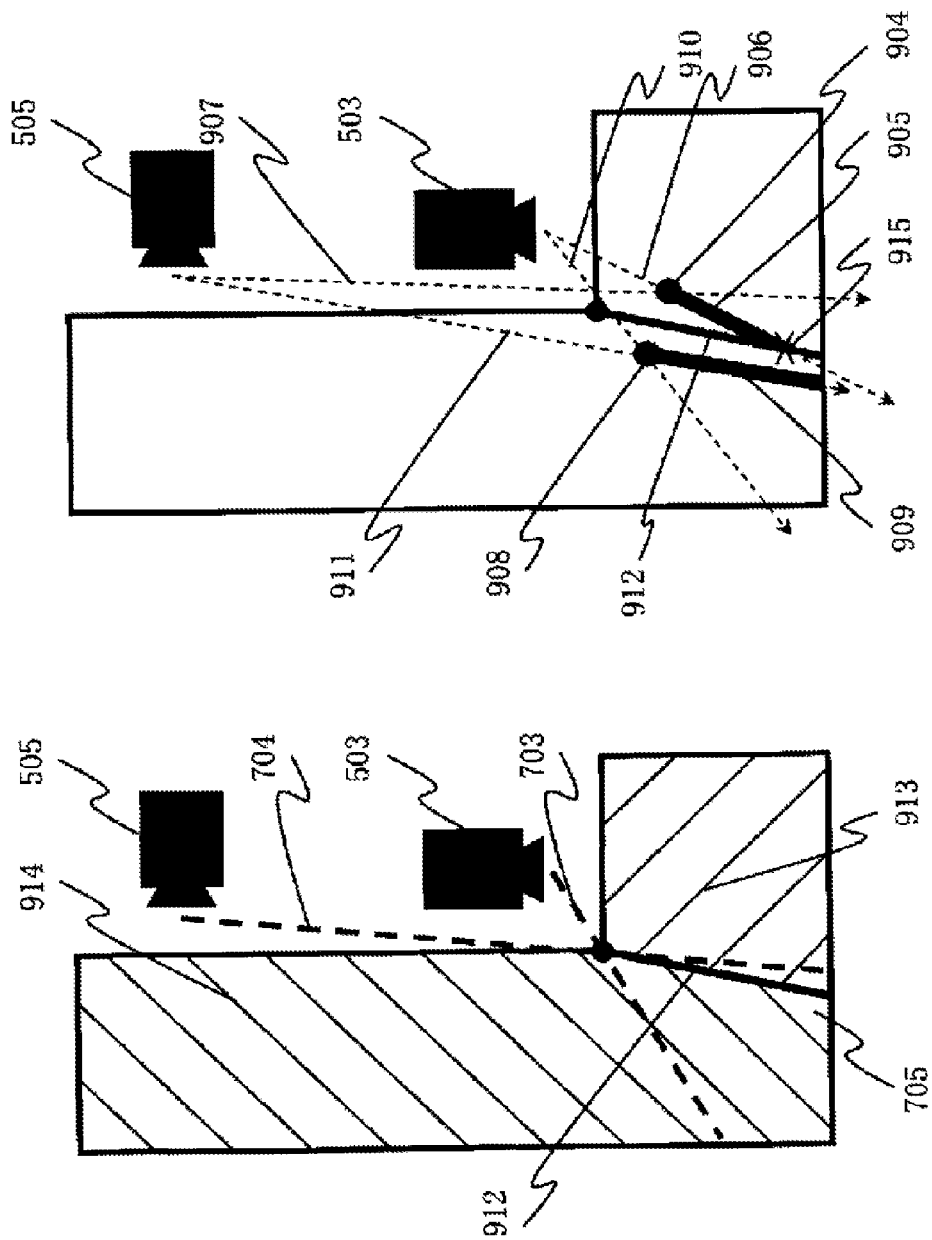
FIG. 7A
FIG. 7B

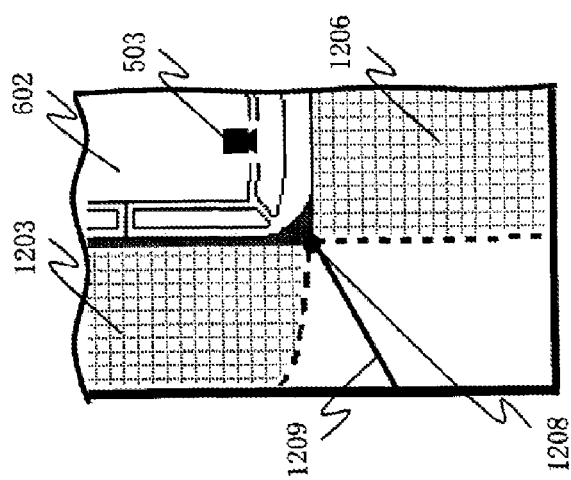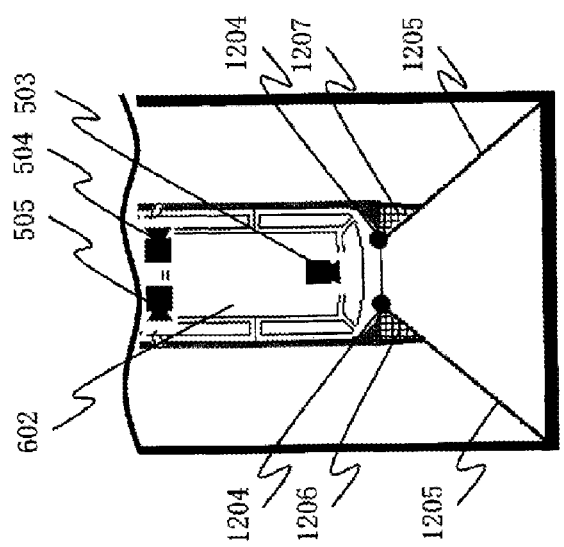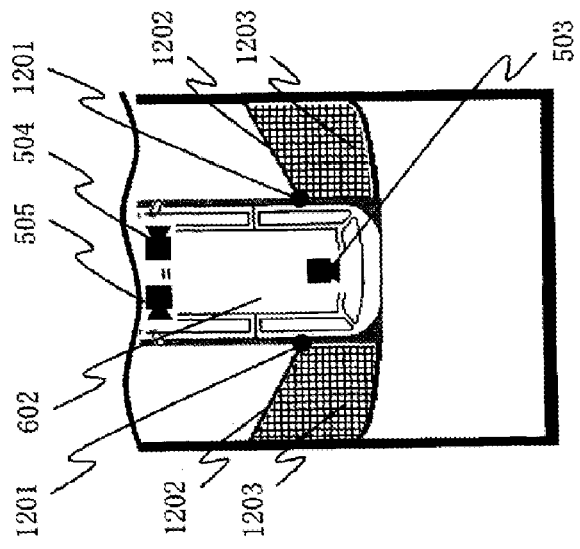

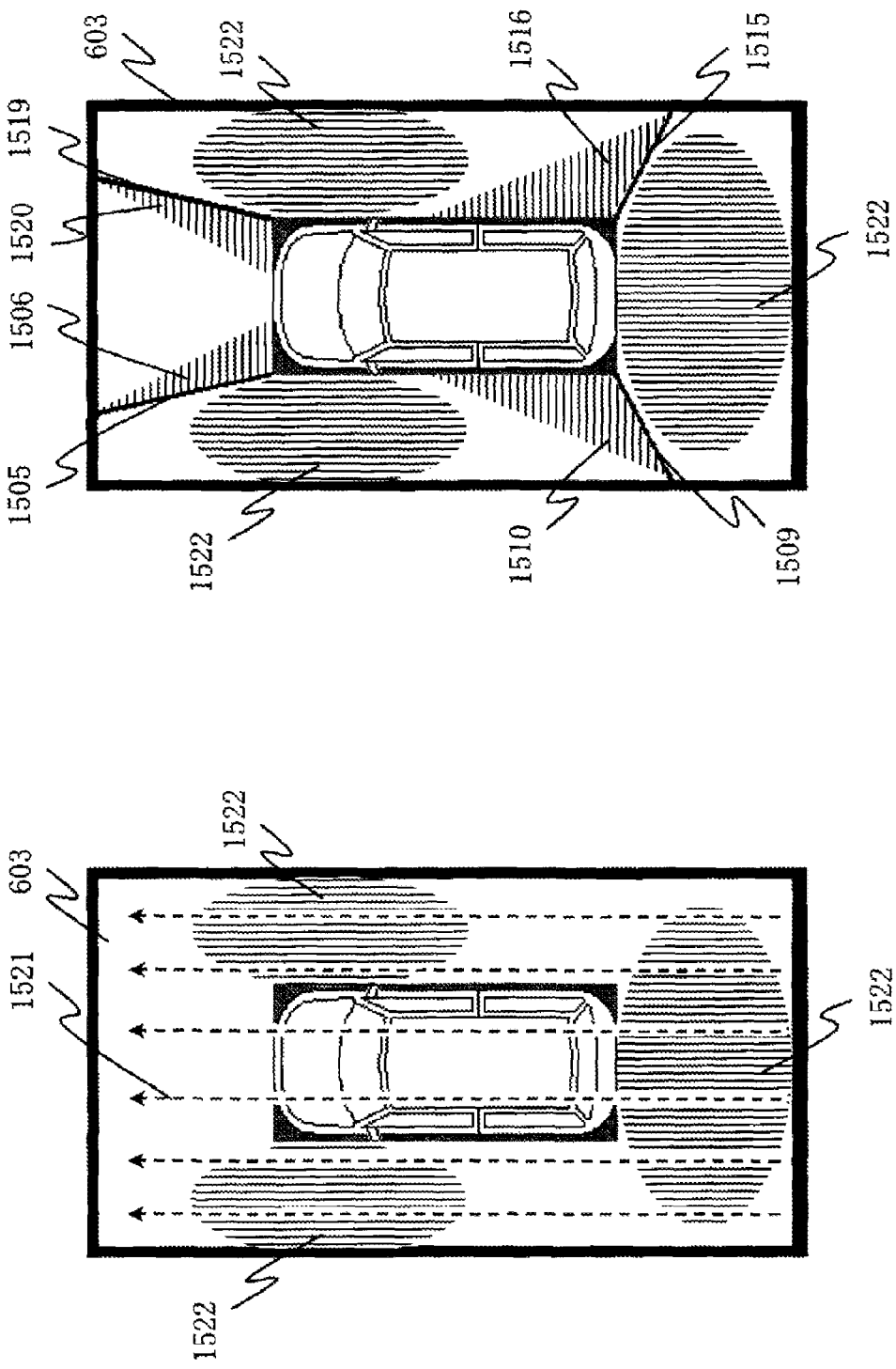

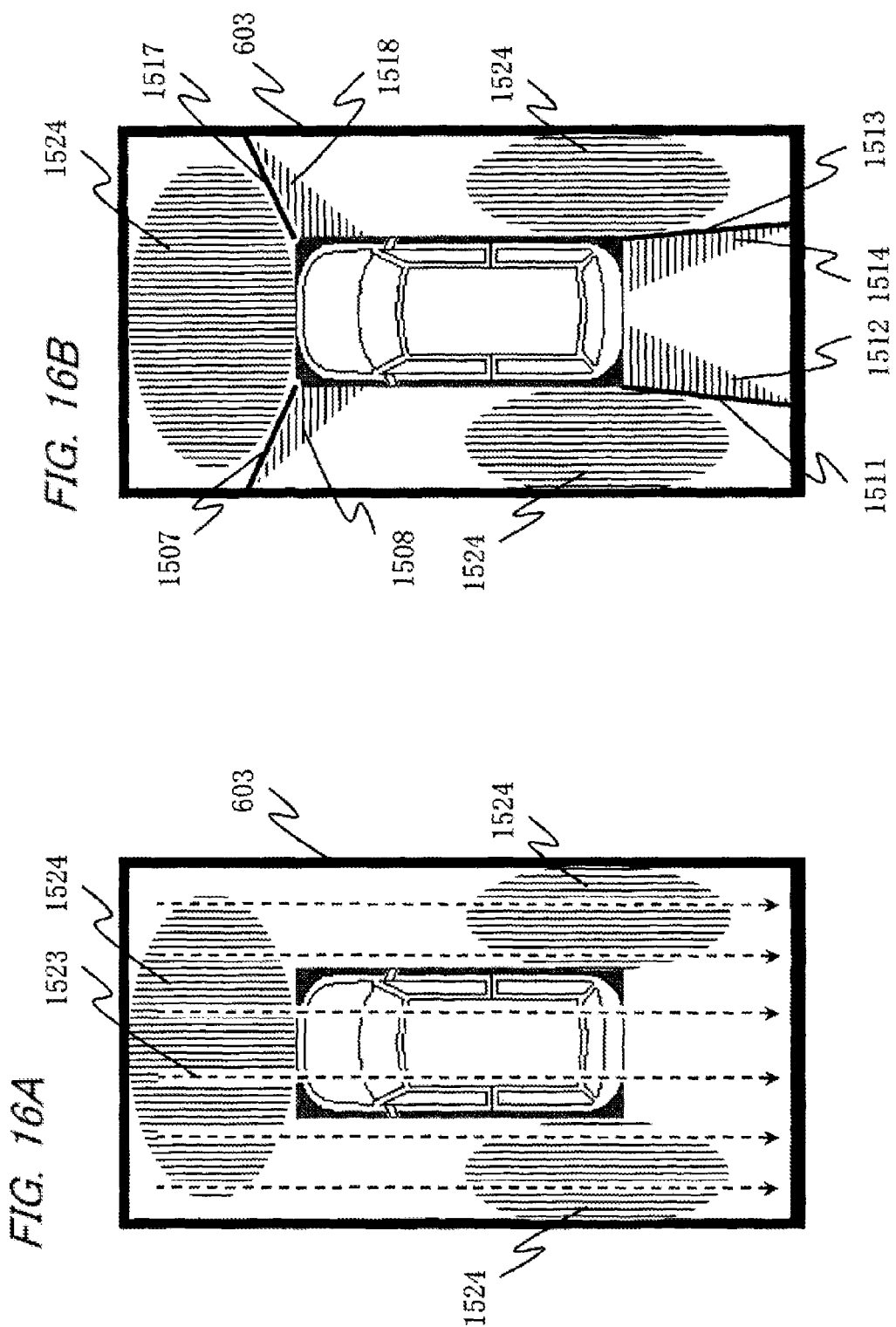

BIRDS-EYE-VIEW IMAGE GENERATION DEVICE, AND BIRDS-EYE-VIEW IMAGE GENERATION METHOD

RELATED APPLICATIONS

This application is a continuation of of International Application No. PCT/JP2012/005923, filed on Sept. 14, 2012, which in turn claims the benefit of Japanese Application No. 2011-217954, filed on Sep. 30, 2011, the disclosures of which Applications are incorporated by reference herein.

BACKGROUND OF THE INVENTION

The present invention relates to a birds-eye-view image generation device, a birds-eye-view image generation method, and a birds-eye-view image generation program, converting captured images acquired from a plurality of imaging devices so as to be output to a display device. Particularly, the present invention relates to a birds-eye-view image combining technique for eliminating an unnatural reflection of a subject around a joint occurring when birds-eye-view images are combined and are displayed.

In recent years, there have been an increase in the number of vehicles in which cameras (imaging devices) are mounted so as for drivers to check front, rear, left and right blind spots with in-vehicle monitors, for improving the safety of road traffic. In addition, a driving supporting system which uses the cameras mounted on the vehicles has been proposed.

This driving supporting system performs a viewpoint conversion process of converting images captured by front, rear, left and right cameras of a vehicle into images (hereinafter, also referred to as a birds-eye-view images) which are viewed from the upper side of the vehicle vertically downward. In addition, the birds-eye-view images are combined so as to generate such a combined birds-eye-view image where a driver looks down at the periphery from the above of the vehicle. Thereby, the driver can continuously recognize the vehicle periphery on a single screen.

There are cases where a solid obstacle is not visible around a joint of images on a combined birds-eye-view image generated by combining a plurality of birds-eye-view images. In order to improve this, it is considered that two birds-eye-view images are displayed so as to overlap each other around the joint; however, in this case, a single solid obstacle may be seen as a double image. In addition, it is considered that two birds-eye-view images are displayed so as not to overlap each other around the joint; however, in this case, the solid obstacle may be seen to be disconnected over the joint and to be discontinuous. As above, even if the remedial measures are performed, it may be difficult for a driver to recognize an obstacle.

In relation to a reduction in visibility for a solid obstacle around the joint of birds-eye-view images, the following techniques are known. For example, a technique is known in which, when a solid obstacle is detected around a joint by obstacle detection means, a display region cutting process is performed on a single or a plurality of different definite reference heights in addition to a road surface level (first reference height), and a plurality of obtained birds-eye-view images are displayed through switching (for example, refer to Patent Reference 1). In addition, a technique is known in which it is determined whether or not there is an obstacle in a region corresponding to a joint of birds-eye-view images with sonars mounted on a vehicle, and, if there is an obstacle in this region, a position of a joint portion of a combined birds-eye-view image is varied (for example, refer to Patent Reference 2).

PRIOR ART REFERENCE

Patent Reference

[Patent Reference 1] JP-A-2010-200240
[Patent Reference 2] JP-A-2007-41791

However, in the technique disclosed in Patent Reference 1, for example, a birds-eye-view image of FIG. 19C which is obtained from a first reference height 101 as shown in FIG. 19A and a birds-eye-view image of FIG. 19D which is obtained from a second reference height 102 as shown in FIG. 19B are displayed through switching. As can be seen from the subjects 104 and 105 reflected in the birds-eye-view images of FIGS. 19C and 19D on which the subject 103 of FIGS. 19A and 19B are converted and displayed, it looks as if the position where the subject is reflected causes transverse movement, longitudinal movement, tilt movement, or the like with respect to the vehicle's own image, for each switching display. In other words, a positional relationship between the subject and the vehicle's own image or a positional relationship between the birds-eye-view images adjacent to each other on the reference height (at the reference height) changes for each switching display.

With this operation, it is considered that a driver who recognizes the combined birds-eye-view image frequently misrecognizes a position of the subject for his/her own vehicle and this disrupts driving. The change in a positional relationship between the vehicle itself and the ground with which the vehicle itself comes into contact or in a positional relationship between the birds-eye-view images adjacent to each other on the reference height is not originally intended in the vehicle.

In addition, in the technique disclosed in Patent Reference 2, a position of a joint varies due to the presence of an obstacle, but the position thereof is not particularly limited. For this reason, if a subject with a height from a reference height (with a predetermined height from the reference height) is reflected in the vicinity of the joint, there is a possibility that the subject is disconnected and is thus discontinuous. This phenomenon may give a driver great discomfort. This will be described with reference to the drawings.

First, features of a birds-eye-view image will be described. FIG. 20 shows a positional relationship between an imaging device 201 and a cuboid 203 installed on a ground 202. The imaging device 201 is in a state of being capable of imaging the ground periphery at a position with a certain height from the ground.

FIG. 21 shows a captured image 301 which is acquired by the imaging device imaging the cuboid 203 of FIG. 20. Grid lines 303 are tetragonal lattice-shaped squares drawn on the ground 202. FIG. 22 shows a birds-eye-view image 304 which is converted through a viewpoint conversion process of projecting the captured image 301 of FIG. 21 onto the ground which is used as a reference. In FIG. 21, the grid lines 303 are converted into grid lines 306 formed by straight lines. Further, the respective points of the cuboid 302 and the cuboid 305 correspond to each other, that is, the point A1 and the point A2, the point B1 and the point B2, the point C1 and the point C2, the point D1 and the point D2, the point E1 and the point E2, the point F1 and the point F2, the point G1 and the point G2, and the point H1 and the point H2, correspond to each other.

At this time, the side connecting the point A2 to the point B2, the side connecting the point C2 to the point D2, the side connecting the point E2 to the point F2, and the side connecting the point G2 to the point H2, on the cuboid 305, are respectively present on the straight lines L1, L2, L3 and L4, as shown in FIG. 23, and the four straight lines intersect each other at a position 307. The same birds-eye-view image 304 as in FIG. 22 is drawn in FIG. 23.

The position 307 is a position on a vertical line where the imaging device 201 acquiring the captured image 301 which is a generation source of the birds-eye-view image 304 is present in the real world with respect to the position where the subject present at the reference height is reflected in the birds-eye-view image 304.

Therefore, the vertical subject in the birds-eye-view image 304 is projected in a radial direction from the position of the imaging device 201, and, this reflection is expressed by "falling-down" of the subject, and the radial direction is expressed by "falling-down direction".

In addition, hereinafter, a position of the imaging device shown in a birds-eye-view image or a vehicle image is the same meaning as the position 307 of the imaging device 201 drawn on FIG. 23.

Next, FIG. 24A shows a relationship between two imaging devices and a region (a display region of a birds-eye-view image) included in birds-eye-view images generated from images which are acquired by the imaging devices in Patent Reference 2. An imaging device 401 generates a birds-eye-view image including a region 403 and a region 405. The imaging device 402 generates a birds-eye-view image including a region 404 and the region 405. Therefore, the region 405 is a location which is generated such that the birds-eye-view images partially overlap each other from a portion of the captured images of both of the imaging devices 401 and 402.

Therefore, it is assumed that the images are joined using a joint in the region 405. For example, as shown in FIG. 24B, when a joint indicated by the dotted line 408 is disposed, a portion of the birds-eye-view image generated from the image of the imaging device 401 is displayed on the region 406 side in the region 405, and a portion of the birds-eye-view image generated from the image of the imaging device 402 is displayed on the region 407 side.

Here, as in the technique disclosed in Patent Reference 2, assuming that a joint of the varied image is disposed at positions indicated by the dotted line 408, the dotted line 409, and the dotted line 410, respectively, the way how a cuboid present at a position of the point 411 on the ground is reflected as in the cuboid 412 of FIGS. 25A, 25B and 25C.

In FIG. 25A in which the joint is disposed at the position indicated by the dotted line 408 (refer to FIG. 24B) and FIG. 25B in which the joint is disposed at the position indicated by the dotted line 409 (refer to FIG. 24B), the display of the cuboid 412 is just disconnected in the middle and disappears, and there is no significant variation in appearance. A difference between FIGS. 25A and 25B is that, in the cuboid 412 of FIG. 25B, a portion increases which is disconnected and disappears to an extent of a disposition location of the joint being changed.

In contrast, in FIG. 25C in which the joint is disposed at the position indicated by the dotted line 410 (refer to FIG. 24B), the cuboid 412 is reflected on the region 406 side and is also reflected on the region 407 in a state of extending over the joint and being disconnected and discontinuous. As above, for example, a combined birds-eye-view image in which it appears as if a single subject is divided into two and there are two subjects may cause misrecognition of a subject state or a position of a vehicle.

As described above, in Patent Reference 1, there is a probability that a positional relationship between the vehicle itself and the birds-eye-view image, and a positional relationship between the birds-eye-view images adjacent to each other on the reference height may be deviated. In addition, in Patent Reference 2, there is a probability that a subject such as a cuboid which extends in a vertical direction to the ground may be displayed disconnectedly over a joint and be reflected discontinuously.

SUMMARY

The present invention has been made in consideration of the circumstances, and an object thereof is to provide a birds-eye-view image generation device, a birds-eye-view image generation method, and a birds-eye-view image generation program capable of recognizing a position or a shape of a subject with high accuracy in a combined birds-eye-view image.

Solution to Problems

According to one aspect of the present invention, there is provided a birds-eye-view image generation device including:

a captured image acquisition unit configured to acquire captured images which are respectively captured by a plurality of imaging devices mounted on a vehicle;

an image conversion unit configured to convert the captured images acquired by the captured image acquisition unit into birds-eye-view images through a viewpoint conversion process;

a birds-eye-view image combining unit configured to combine the plurality of birds-eye-view images converted by the image conversion unit; and a joint setting unit configured to set any position of a rim of a vehicle image corresponding to a vehicle included in the birds-eye-view images as an end point in an overlapping imaging range in two birds-eye-view images corresponding to two imaging devices of which imaging ranges overlap each other, and configured to set a line which extends in any direction on an opposite side to the vehicle image from the end point and between two radial directions directed to the end point from the two imaging devices, as a joint which joins two birds-eye-view images which are combined by the birds-eye-view image combining unit.

With this configuration, in any birds-eye-view image of the imaging devices, a vertical subject which falls down in a radial direction from the imaging device is not reflected so as to be disconnected over a joint and be discontinuous while maintaining a positional relationship between the vehicle itself and the birds-eye-view image, and a positional relationship on the reference height between the birds-eye-view images adjacent to each other. In addition, a subject state or a position of a vehicle is easily recognized without misunderstanding. As above, a position or a shape of a subject in the combined birds-eye-view image can be recognized with high accuracy. Therefore, it is possible to improve visibility during a driving operation.

In the birds-eye-view image generation device, the joint setting unit may be configured to set the joint in either one of the two radial directions in the two birds-eye-view images.

With this configuration, in a range included in the birds-eye-view image of the imaging device which is used as a reference of the direction along the joint, falling-down of the vertical subject does not occur in a direction crossing the joint in any position. Therefore, the subject is largely displayed and thus the presence of the subject is easily recognized without display of the subject in the height direction being disconnected and disappearing in the middle in this range.

In the birds-eye-view image generation device, the joint setting unit may be configured to set the joint in a direction close to a first radial direction from a line of sight direction when a first angle formed by the line of sight direction of a driver of the vehicle and the first radial direction is smaller than a second angle formed by the line of sight direction and a second radial direction.

With this configuration, the birds-eye-view image in which the falling-down direction of the vertical subject is close to the line of sight direction of the driver is displayed, and the birds-eye-view image side of the imaging device distant from the line of sight direction of the driver is concealed by the birds-eye-view image close thereto and thus is not displayed. Thereby, only the birds-eye-view image is displayed in which the falling-down direction of the subject is close to the line of sight direction in which the driver views the vertical subject from the driver's seat, and thus a direction in which the subject is present with respect to the driver is easily recognized.

In the birds-eye-view image generation device, the joint setting unit may be configured to set a corner portion of the vehicle image as the end point in the two birds-eye-view images.

With this configuration, in a range included in the birds-eye-view image, it is difficult for a vehicle with a height from the reference height to be displayed, and an unnecessary reflection of the vehicle itself is easily removed. In addition, only a single display region of a birds-eye-view image generated from the imaging device of which a position is closest to one side of the vehicle image is adjacent to the one side of the vehicle image, and thereby one side of the vehicle image conforms to a direction of the birds-eye-view image such that a direction in which a subject is present with respect to the vehicle is easily recognized.

The birds-eye-view image generation device may further include:

a vehicle information acquisition unit configured to acquire vehicle information of the vehicle, wherein the joint setting unit is configured to set the joint on the basis of the vehicle information acquired by the vehicle information acquisition unit.

With this configuration, a position of the joint can be changed depending on usages or peripheral circumstances of the vehicle, and thereby a position of the subject for the vehicle is easily recognized without misunderstanding.

In the birds-eye-view image generation device, the vehicle information acquisition unit may be configured to acquire the vehicle information including a traveling direction of the vehicle, and wherein the joint setting unit may be configured to set the joint so as to avoid a region on a traveling direction side of the vehicle, and regions in an opposite direction to the traveling direction in a direction perpendicular to the traveling direction.

With this configuration, when a traveling direction of the vehicle is added, it is possible to prevent the subject in the image being disconnected and disappearing at a position where a driver desires to visually recognize the most.

The birds-eye-view image generation device may further include:

an image output unit configured to simultaneously output a combined birds-eye-view image which is combined by the birds-eye-view image combining unit and the captured image which is acquired by the captured image acquisition unit or the birds-eye-view image which is converted by the image conversion unit.

With this configuration, it is possible to simultaneously output the combined birds-eye-view image and other images related to the captured images which are bases of the combined birds-eye-view image. Therefore, it is possible to improve visibility of a solid body which is considerably deformed and is thus hard for a driver to recognize on a combined birds-eye-view image in a single image, and to secure a wide field of view, and thereby the visibility is supplemented.

According to another aspect of the present invention, there is provided a birds-eye-view image generation method of a birds-eye-view image generation device, including:

acquiring captured images which are captured by a plurality of imaging devices;

converting the acquired captured images into birds-eye-view images through a viewpoint conversion process;

combining the plurality of converted birds-eye-view images; and setting any position of a rim of a vehicle image corresponding to a vehicle included in the birds-eye-view image as an end point in an overlapping imaging range in two birds-eye-view images corresponding to two imaging devices of which imaging ranges overlap each other, and setting a line which extends in any direction on an opposite side to the vehicle image from the end point between two radial directions directed to the end point from the two imaging devices, as a joint which joins two birds-eye-view images which are combined by the birds-eye-view image combining unit.

With this method, in any birds-eye-view image of the imaging devices, a vertical subject which falls down in a radial direction from the imaging device is not reflected so as to be disconnected over a joint and be discontinuous while maintaining a positional relationship between the vehicle itself and the birds-eye-view image, and a positional relationship on the reference height between the birds-eye-view images adjacent to each other. In addition, a subject state or a position of a vehicle is easily recognized without misunderstanding. As above, a position or a shape of a subject in the combined birds-eye-view image can be recognized with high accuracy. Therefore, it is possible to improve visibility during a driving operation.

BRIEF DESCRIPTION OF THE DRAWINGS

FIGS. 5A to 5D are diagrams illustrating an example of the radial line which passes through an end point in an angle of view at which an imaging device can perform imaging according to the first embodiment of the present invention.

FIGS. 7A and 7B are diagrams illustrating an example of the combined portion of two birds-eye-view images adjacent to each other in a combined birds-eye-view image according to the second embodiment of the present invention.

FIG. 11A is a diagram illustrating an example of a part of the combined birds-eye-view image when an end point of a joint is located on each side indicating an side end of a vehicle image according to a fourth embodiment of the present invention; FIG. 11B is a diagram illustrating an example of a part of the combined birds-eye-view image when an end point of a joint is located on a side indicating a rear end of the vehicle image according to the fourth embodiment of the present invention; and FIG. 11C is a diagram illustrating an example of a part of the combined birds-eye-view image when an end point of a joint is located at a corner portion of the vehicle image according to the fourth embodiment of the present invention.

FIG. 15A is a diagram illustrating an example of the visually recognized region of a driver when a vehicle moves backward according to the fifth embodiment of the present invention, and FIG. 15B is a diagram illustrating an example of the visually recognized region of the driver and the joints between a plurality of birds-eye-view images when the vehicle moves backward according to the fifth embodiment of the present invention.

FIG. 16A is a diagram illustrating an example of the visually recognized region of the driver when the vehicle moves forward according to the fifth embodiment of the present invention, and FIG. 16B is a diagram illustrating an example of the visually recognized region of the driver and the joints between a plurality of birds-eye-view images when the vehicle moves forward according to the fifth embodiment of the present invention.

DETAILED DESCRIPTION OF EMBODIMENTS

Hereinafter, embodiments of the present invention will be described with reference to the drawings.

(First Embodiment)

Figure 1:
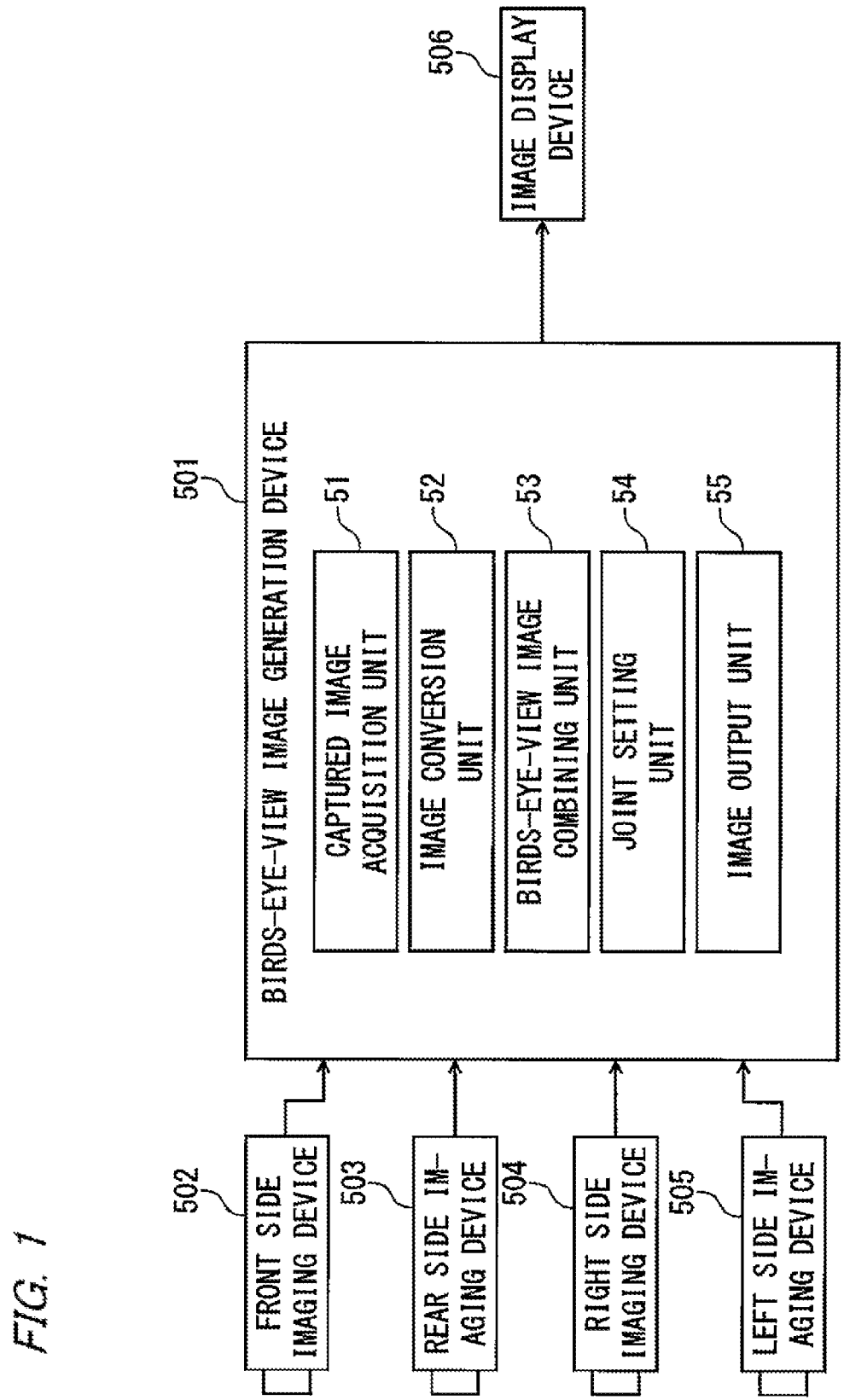
FIG. 1 is a block diagram illustrating a configuration example of the birds-eye-view image output system according to a first embodiment of the present invention.

FIG. 1 is a block diagram illustrating a configuration example of the birds-eye-view image output system according to the first embodiment of the present invention.

A birds-eye-view image generation device 501 is mounted on, for example, a vehicle, and performs various processes such as a process of generating a birds-eye-view image. A front side imaging device 502 images the front periphery of a vehicle. A rear side imaging device 503 images the rear periphery of the vehicle. A right side imaging device 504 images the right side periphery of the vehicle. A left side imaging device 505 images the left side periphery of the vehicle. An image display device 506 is an in-vehicle monitor which is installed in the vehicle and displays an input image or the like. These devices 501 to 506 are electrically connected to each other. The imaging devices 502 to 505 are mounted on the vehicle, and generally have an angle of view of 180 degrees.

As shown in FIG. 1, the birds-eye-view image generation device 501 is connected to the front side imaging device 502, the rear side imaging device 503, the right side imaging device 504, and the left side imaging device 505 on the input side, and is connected to the image display device 506 on the output side.

The front side imaging device 502, the rear side imaging device 503, the right side imaging device 504, the left side imaging device 505, and the image display device 506, which are connected to the birds-eye-view image generation device 501, may be connected thereto via an Electrical Control Unit (ECU) (not shown) installed in the vehicle.

The birds-eye-view image generation device 501 includes well-known CPU, ROM, RAM, and the like, and is constituted by a captured image acquisition unit 51, an image conversion unit 52, a birds-eye-view image combining unit 53, a joint setting unit 54, and an image output unit 55. Each function of the captured image acquisition unit 51, an image conversion unit 52, the birds-eye-view image combining unit 53, the joint setting unit 54, and the image output unit 55 is realized, for example, by the CPU in the birds-eye-view image generation device 501 executing a program stored in the ROM.

The captured image acquisition unit 51 acquires a captured image which is an image captured by each of the imaging devices 502 to 505 via a line or a cable in a wired or wireless manner.

The image conversion unit 52 converts a captured image acquired by the captured image acquisition unit 51 into a birds-eye-view image through a viewpoint conversion process. The birds-eye-view image is an image which is drawn as if an observer looks down on the ground from a high location. An example of the viewpoint conversion process is disclosed in the following literature.

(Reference PTL) JP-A-2004-289386

The birds-eye-view image combining unit 53 combines a plurality of birds-eye-view images converted by the image conversion unit 52 so as to generate a combined birds-eye-view image. In addition, the birds-eye-view image combining unit 53 joins a plurality of images at a joint set by the joint setting unit 54 so as to generate a combined birds-eye-view image.

Figure 2B:
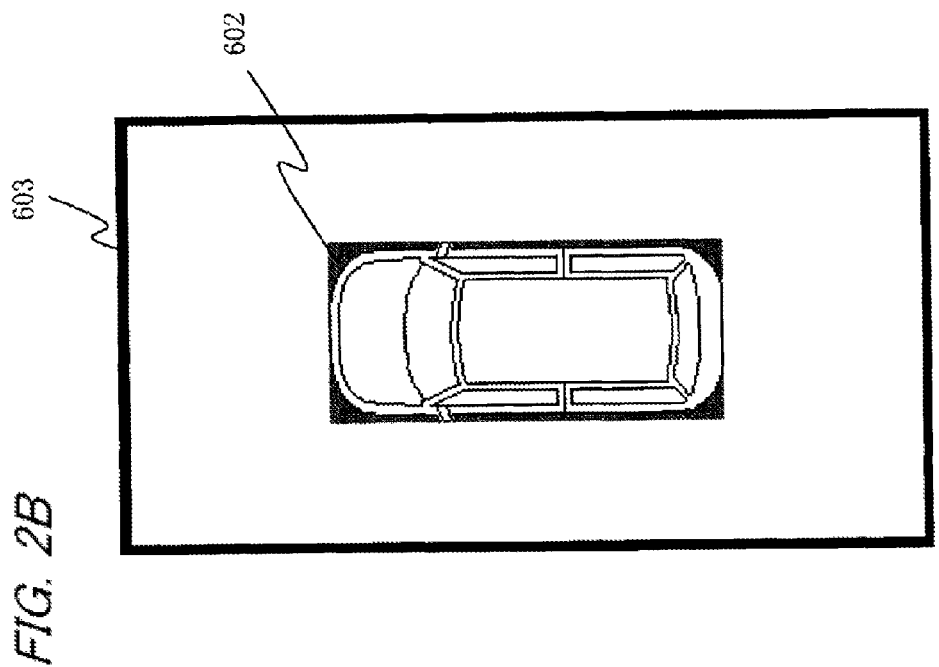
FIG. 2B is a diagram illustrating an example of the combined birds-eye-view image displayed on an image display device according to the first embodiment of the present invention.
Figure 3A:
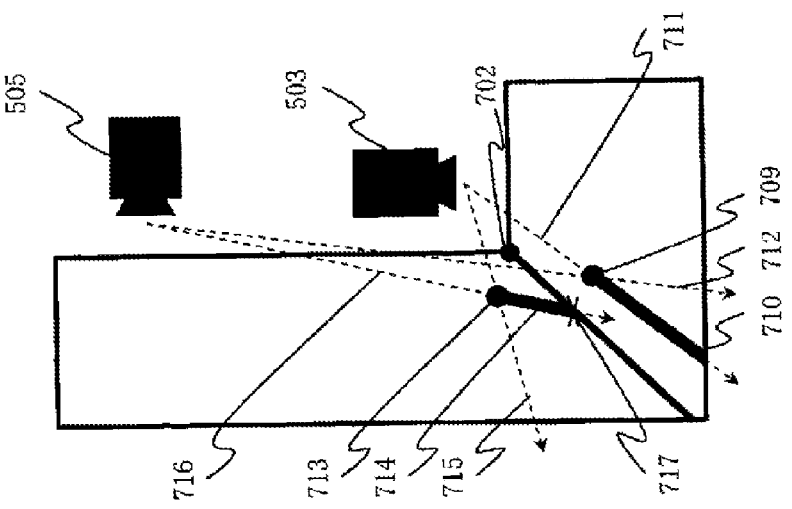
FIGS. 3A to 3C are diagrams illustrating an example of the combined portion of two birds-eye-view images adjacent to each other in a combined birds-eye-view image according to the first embodiment of the present invention.

In relation to the joint setting unit 54, in two birds-eye-view images (for example, refer to the reference numerals 707 and 708 in FIG. 3B) corresponding to two imaging devices (for example, refer to the reference numerals 503 and 505 in FIG. 3A) of which imaging ranges overlap each other, the joint setting unit 54 sets any position of a rim of a vehicle image (for example, refer to the reference numeral 602 in FIG. 2B) corresponding to the vehicle included in the birds-eye-view image as an end point (for example, refer to the reference numeral 702 in FIG. 3A) in the overlapping imaging range (for example, refer to the reference numeral 705 in FIG. 3A). In addition, the joint setting unit sets a line which extends in any direction on an opposite side to the vehicle image from the end point between two radial directions (for example, refer to the reference numerals 703 and 704 in FIG. 3A) directed to the end point from the two imaging devices, as a joint (for example, refer to the reference numeral 706 in FIG. 3B) which joins two birds-eye-view images which are combined by the birds-eye-view image combining unit 53. In addition, the end point described in the present embodiment indicates an end point of the joint close to the imaging device. Details of the joint setting method by the joint setting unit 54 will be described later. For example, a single joint is set every two joined birds-eye-view images.

The image output unit 55 outputs a combined birds-eye-view image generated by the birds-eye-view image combining unit 53 or other images to the image display device 506 via a line or a cable in a wired or wireless manner.

Figure 2A:
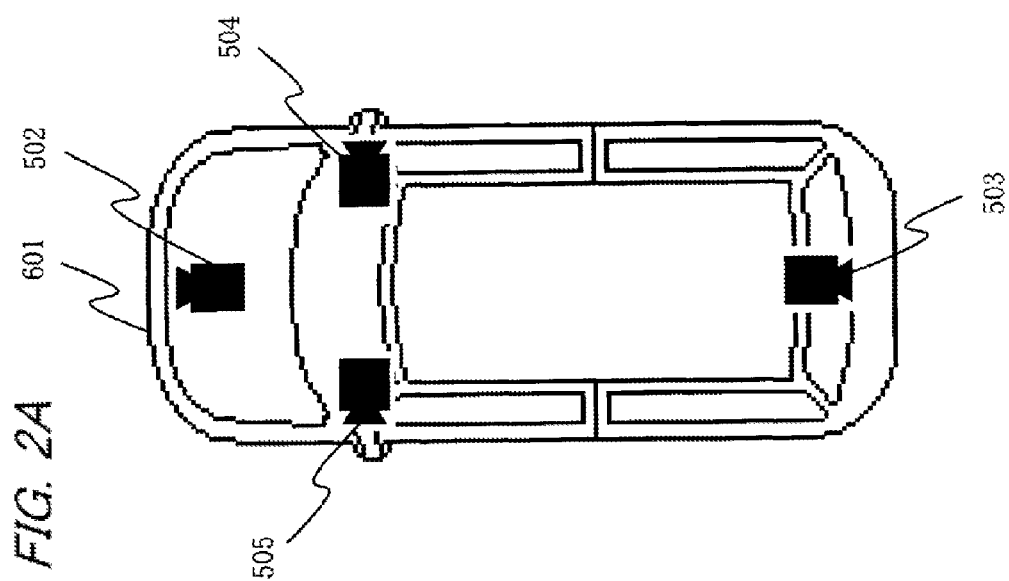
FIG. 2A is a diagram illustrating an example of the relationship between each imaging device and a position and a direction of a vehicle according to the first embodiment of the present invention.

Positional and directional relationships between the respective imaging devices 502 to 505 and the vehicle 601 are as shown in FIG. 2A. In addition, a combined birds-eye-view image 603 displayed on the image display device 506 is as shown in FIG. 2B. The vehicle image 602 assumes a position where the vehicle 601 is present in the real world. Here, the region of the vehicle image 602 is shown in a rectangular region, but a shape of the region is not limited to the rectangular shape. The combined birds-eye-view image 603 is obtained by the image conversion unit 52 performing a viewpoint conversion process on captured images of the imaging devices 502 to 505 so as to surround the overall periphery of the vehicle image 602 and by the birds-eye-view image combining unit 53 combining the images.

Next, a method of generating a birds-eye-view image performed by the birds-eye-view image generation device 501 will be described.

Figure 3B:
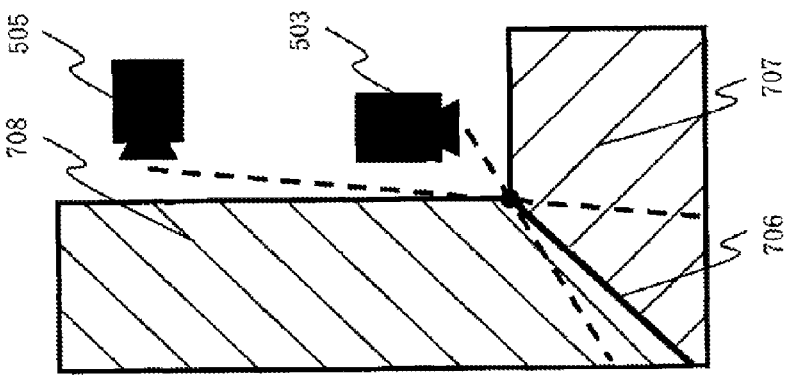
Figure 3C:
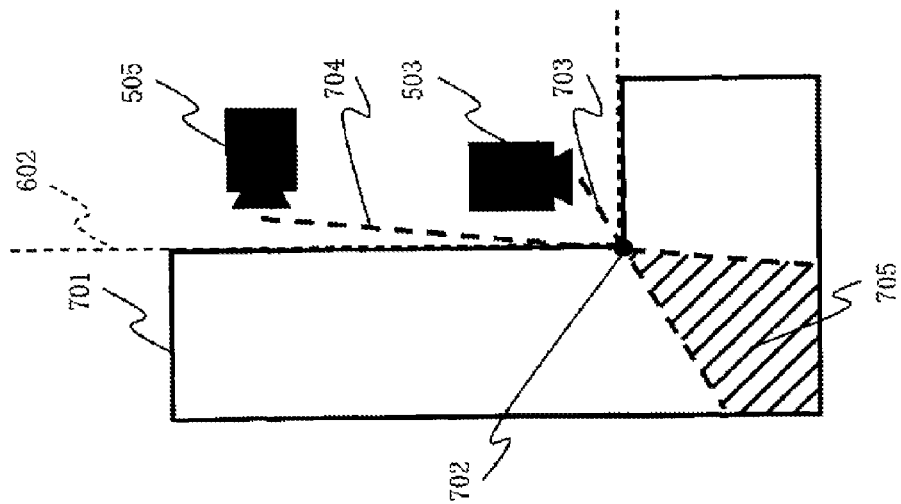

FIGS. 3A to 3C are diagrams illustrating an example of the combined portion of two birds-eye-view images adjacent to each other in the combined birds-eye-view image 603 (refer to FIG. 2B). In FIG. 3A, the reference numeral 701 indicates a range (a display region of a birds-eye-view image) included in the birds-eye-view image generated from a captured image of the rear side imaging device 503 or the left side imaging device 505. The reference numeral 702 indicates an end point of the joint close to the imaging devices 503 and 505. The reference numeral 703 indicates a radial line passing through the end point 702 from the position of the rear side imaging device 503. The reference numeral 704 indicates a radial line passing through the end point 702 from the position of the left side imaging device 505. The reference numeral 705 indicates a range surrounded by the display range 701, the radial line 703, and the radial line 704. This range is a range in which an imaging range of the rear side imaging device 503 overlaps an imaging range of the left side imaging device 505.

FIG. 3B shows a region 707 where a part of the birds-eye-view image of the rear side imaging device 503 is displayed and a region 708 where a part of the birds-eye-view image of the left side imaging device 505 is displayed when the joint 706 is disposed in any radial direction from the end point 702 inside the range 705.

FIG. 3C is a diagram illustrating a state in which two birds-eye-view images are combined based on the joint 706 and vertical subjects 710 and 714 are respectively reflected at positions 709 and 713 on the reference height. In addition, the vertical subject in the present embodiment is a subject vertical to the ground.

In addition, only in FIG. 3A, a part (rim) of the vehicle image 602 is shown.

The vertical subject 710 reflected at the position 709 falls down in a direction of the radial line 711 passing through the position 709 from the rear side imaging device 503 and in a direction of the radial line 712 passing through the position 709 from the left side imaging device 505. However, the image display device 506 displays only the falling-down in the direction of the radial line 711 depending on the positional relationship between the region 707 and the region 708.

At this time, neither of the radial lines intersects the joint 706 in two external directions (directions directed to an opposite side to the rear side imaging device 503 and the left side imaging device 505) from the position 709 on the radial lines 711 and 712 where the vertical subject 710 falls down.

In addition, the vertical subject 714 reflected at the position 713 falls down in a direction of the radial line 715 passing through the position 713 from the rear side imaging device 503 and in a direction of the radial line 716 passing through the position 713 from the left side imaging device 505. However, the image display device 506 displays only the falling-down in the direction of the radial line 716 depending on the positional relationship between the region 707 and the region 708. The display of the falling-down is disconnected at a position of the intersection 717 between the joint 706 and the radial line 716.

At this time, the radial line intersects the joint 706 in the external direction (a direction directed to an opposite side to the left side imaging device 505) from the position 713 on the radial line 716 where the vertical subject 714 falls down. On the other hand, the radial line does not intersect the joint 706 in the external direction (a direction directed to an opposite side to the rear side imaging device 503) from the position 713 on the radial line 715 where the vertical subject similarly falls down.

As in the example of FIGS. 3A to 3C, in a case where the joint 706 is disposed in a direction (within the range 705) between the radial line 703 and the radial line 704 from the end point 702 so as to be within the range 705, not both of the two radial lines intersect the joint 706 in the external directions of the two radial lines from the two imaging devices 503 and 505 even if the subject is reflected at any position. For example, in external directions where falling-down occurs from the position of the subject 710 (714) in the two radial lines 711 and 712 (715 and 716) passing through the subject 710 (714) from the two imaging devices 503 and 505, either one of the two intersects the joint 706 but not both of the two intersect the joint.

Figure 4A:
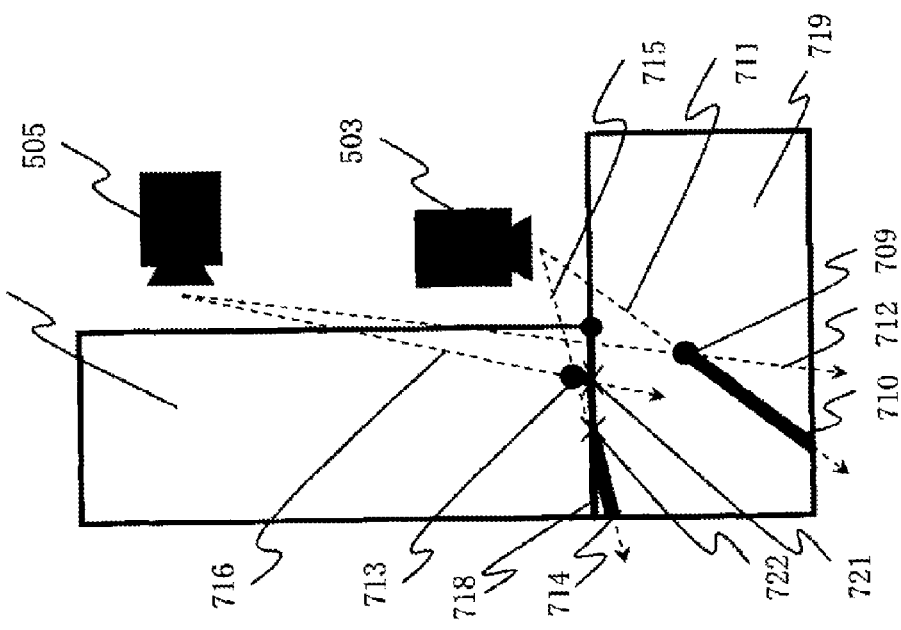
FIGS. 4A and 4B are diagrams illustrating an example of the combined portion of two birds-eye-view images adjacent to each other in a combined birds-eye-view image according to the first embodiment of the present invention.

On the other hand, FIG. 4A shows a region 719 where a part of the birds-eye-view image of the rear side imaging device 503 is displayed and a region 720 where a part of the birds-eye-view image of the left side imaging device 505 is displayed when a joint 718 is disposed in a radial direction from the end point 702 outside the range 705.

Figure 4B:
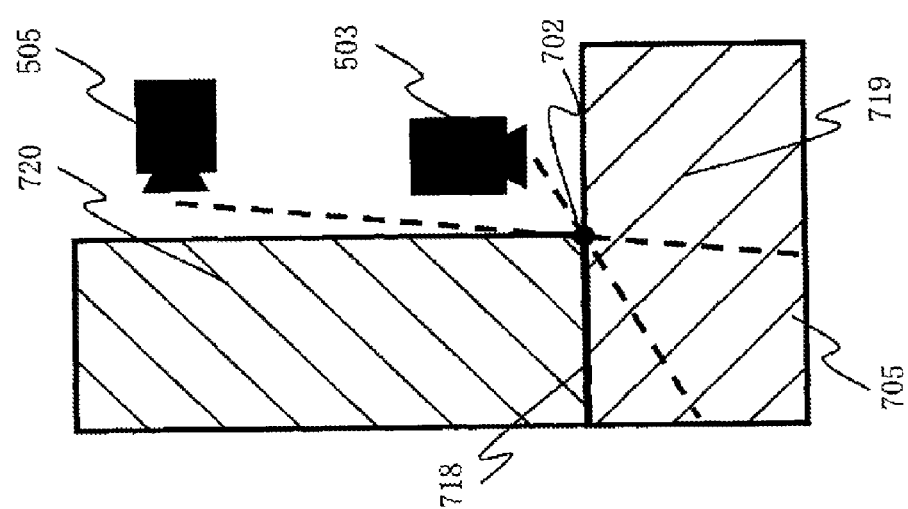

FIG. 4B is a diagram illustrating a state in which two birds-eye-view images are combined based on the joint 718 and vertical subjects 710 and 714 are respectively reflected at positions 709 and 713 on the same reference height as in FIG. 3C. The vertical subject 710 reflected at the position 709, which falls down in only one direction of the direction of the radial line 711, in the same manner as FIG. 3A, is displayed.

In contrast, the vertical subject 714 reflected at the position 713 is significantly different from FIG. 3C. Here, the display of falling-down in the direction of the radial line 716 depending on a positional relationship between the region 719 and the region 720 is disconnected at a position of the intersection 721 between the joint 718 and the radial line 716. In addition, the display of falling-down in the direction of the radial line 715 is disconnected at a position of the intersection 722 between the joint 718 and the radial line 715. Therefore, the subject 714 is discontinuously displayed.

At this time, the radial line intersects the joint 718 in the external direction (a direction directed to an opposite side to the rear side imaging device 503) from the position 713 on the radial line 715 where the vertical subject 714 falls down. Similarly, the radial line also intersects the joint 718 in the external direction (a direction directed to an opposite side to the left side imaging device 505) from the position 713 on the radial line 716 where the vertical subject 714 falls down.

As in the example of FIGS. 4A and 4B, when the joint 718 is disposed in a direction which is not a range between the radial line 703 and the radial line 704 extending from the end point 702 so as to be deviated from the range 705, both of the two radial lines may intersect the joint 718 in two external directions of the two radial lines from the two imaging devices depending on a position of a subject. For example, in external directions where falling-down occurs from the position of the subject 714 in the two radial lines 715 and 716 passing through the position of the subject 714 from the two imaging devices 503 and 505, both of the two radial lines 715 and 716 intersect the joint 718. In this case, the vertical subject 714 is disconnected over the joint and is discontinuously displayed.

As described above, the birds-eye-view image generation device 501 of the present embodiment includes the captured image acquisition unit 51 which acquires a captured image which is captured by a plurality of imaging devices 503 and 505, the image conversion unit 52 which converts the acquired captured image into a birds-eye-view image through a viewpoint conversion process, the birds-eye-view image combining unit 53 which combines a plurality of converted birds-eye-view images, and the joint setting unit 54. In two birds-eye-view images corresponding to two imaging devices 503 and 505 of which imaging ranges overlap each other, the joint setting unit 54 sets any position of a rim of a vehicle image corresponding to the vehicle included in the birds-eye-view image as the end point 702 in the overlapping imaging range, and sets a line which extends in any direction on an opposite side to the vehicle image from the end point 702 between directions (radial directions) of the two radial lines 703 and 704 directed to the end point 702 from the two imaging devices 503 and 505, as the joint 706 which joins two birds-eye-view images which are combined by the birds-eye-view image combining unit 53.

In this case, in the external directions in which falling-down occurs of the two radial lines 711 and 712 (715 and 716) passing through the position 709 (713) of the subject 710 (714) from the positions of the two imaging devices 503 and 505 of which imaging ranges overlap each other, neither of the two radial lines 711 and 712 (715 and 716) intersects or either one intersects the joint 706.

Figures 19A, 19B, 19C, 19D:
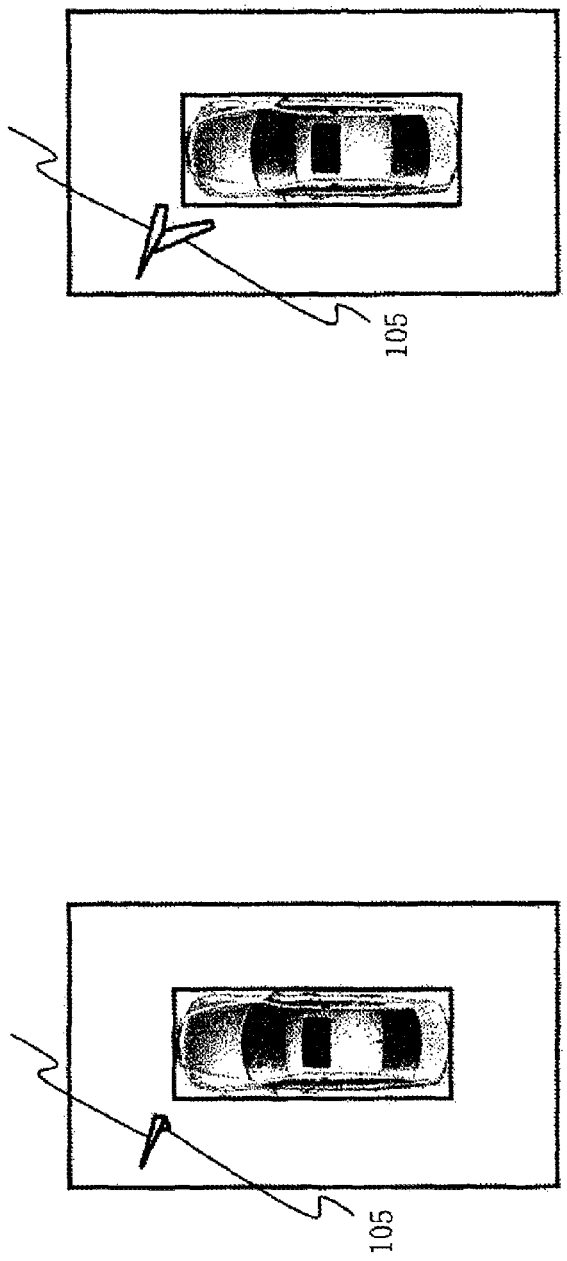
FIG. 19A is a diagram illustrating a relationship between a vehicle, a subject, and a first reference height in the related art.
FIG. 19B is a diagram illustrating a relationship between a vehicle, a subject, and a second reference height in the related art.
FIG. 19C is a diagram illustrating a birds-eye-view image obtained from the first reference height in the related art.
FIG. 19D is a diagram illustrating a birds-eye-view image obtained from the second reference height in the related art.
Figure 20:
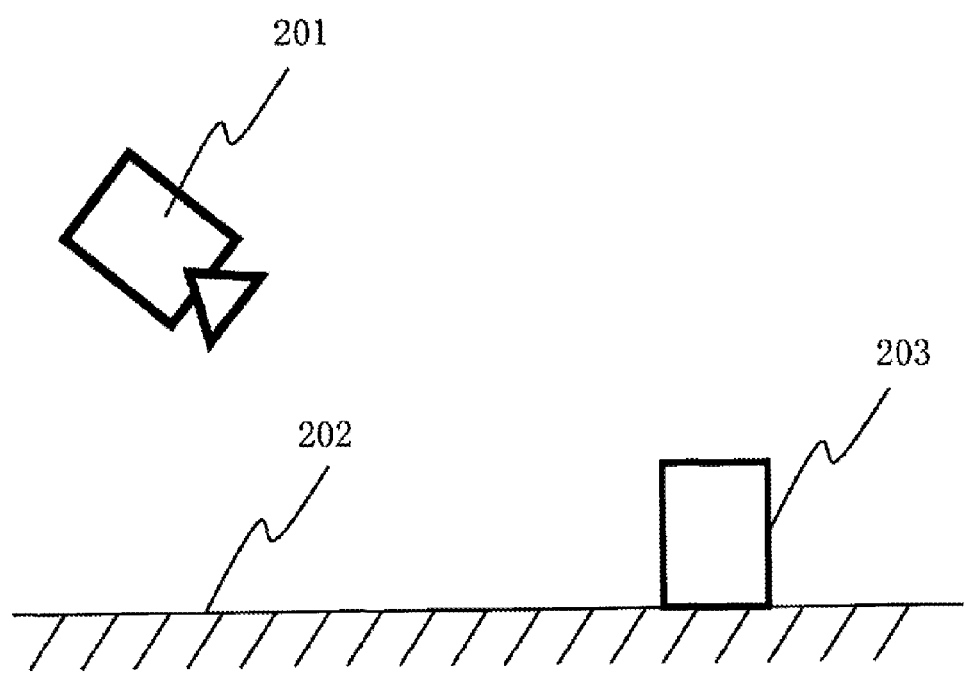
FIG. 20 is a diagram illustrating a positional relationship between an imaging device and a cuboid installed on the ground in the related art.
Figure 21:
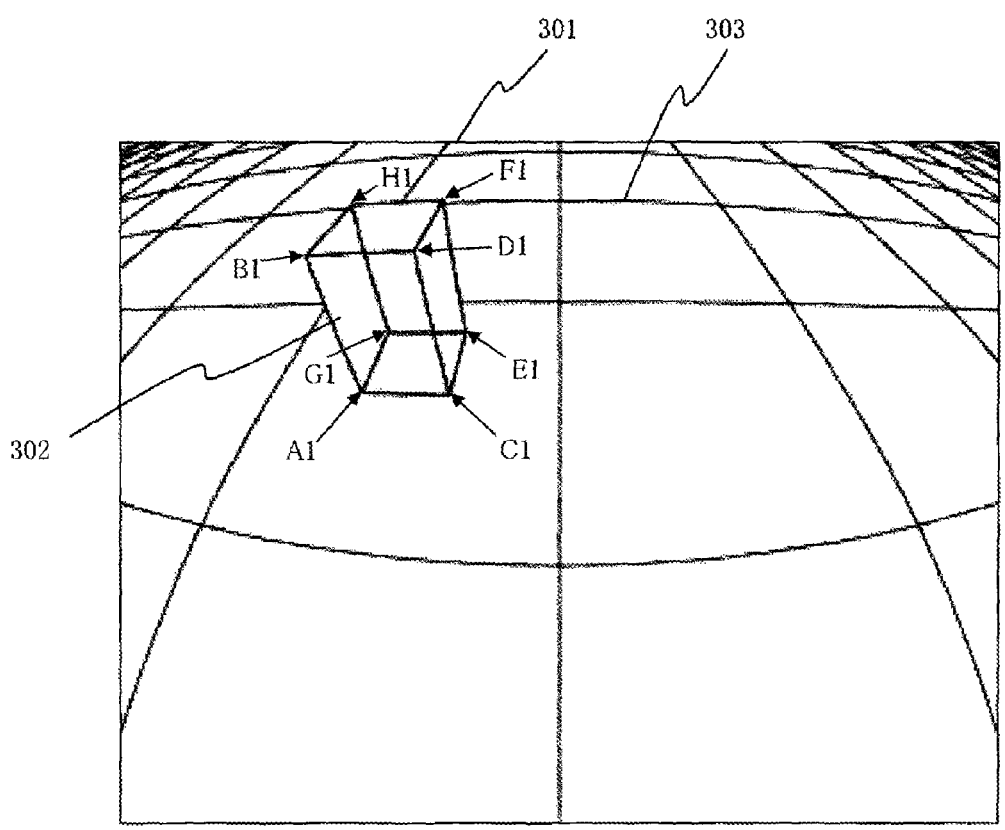
FIG. 21 is a diagram illustrating a captured image acquired by the imaging device imaging the cuboid of FIG. 20.
Figure 22:
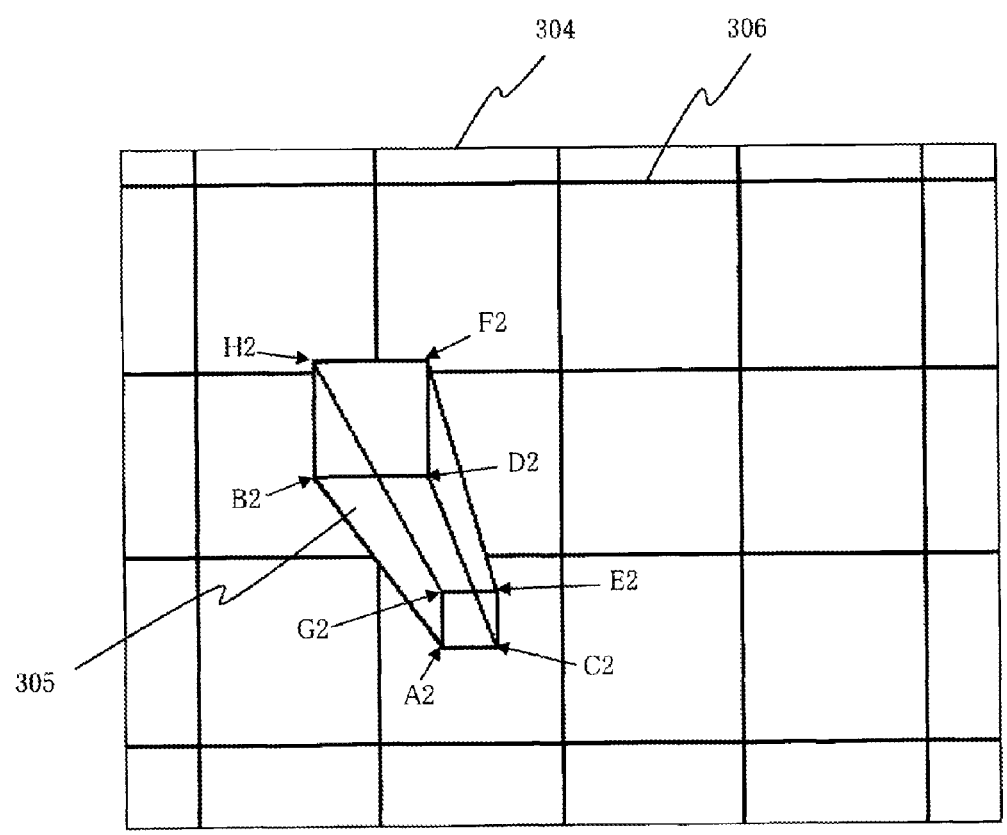
FIG. 22 is a diagram illustrating a birds-eye-view image converted through a viewpoint conversion process of projecting the captured image of FIG. 21 onto the ground which is used for a reference.
Figure 23:
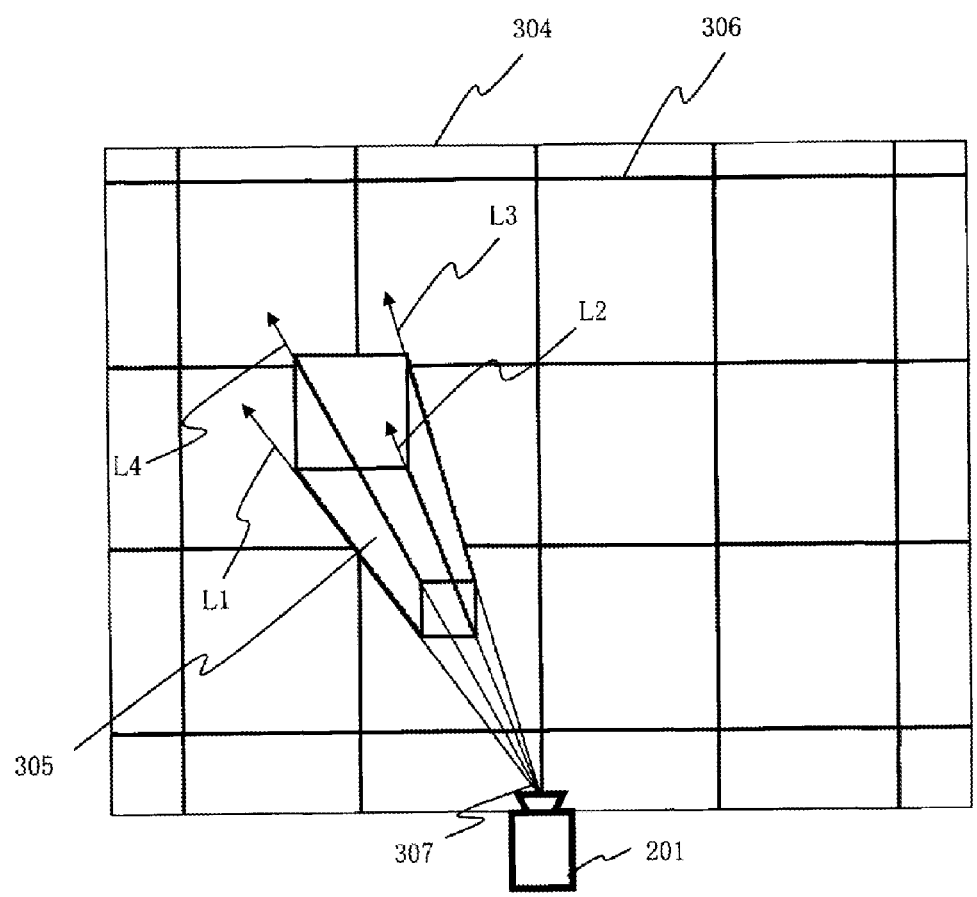
FIG. 23 is a diagram illustrating that line segments in a height direction of a cuboid of the birds-eye-view image of FIG. 22 intersect each other at a predetermined point.
Figure 24A:
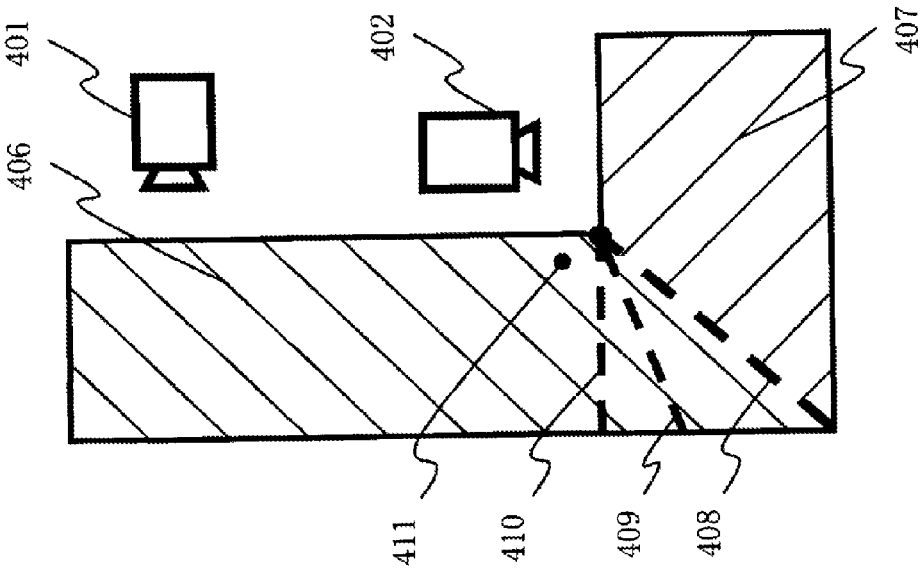
FIG. 24A is a diagram illustrating a relationship between two imaging devices and display regions including birds-eye-view images generated from images acquired by the imaging devices in the related art.
Figure 24B:
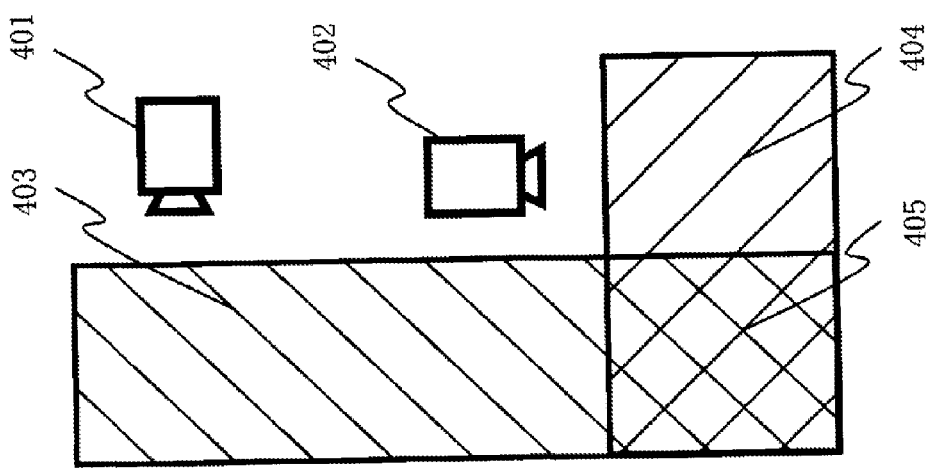
FIG. 24B is a diagram illustrating a relationship between two imaging devices, display regions including birds-eye-view images generated from images acquired by the imaging devices, and joints of the birds-eye-view images of the two imaging devices in the related art.
Figure 25C:
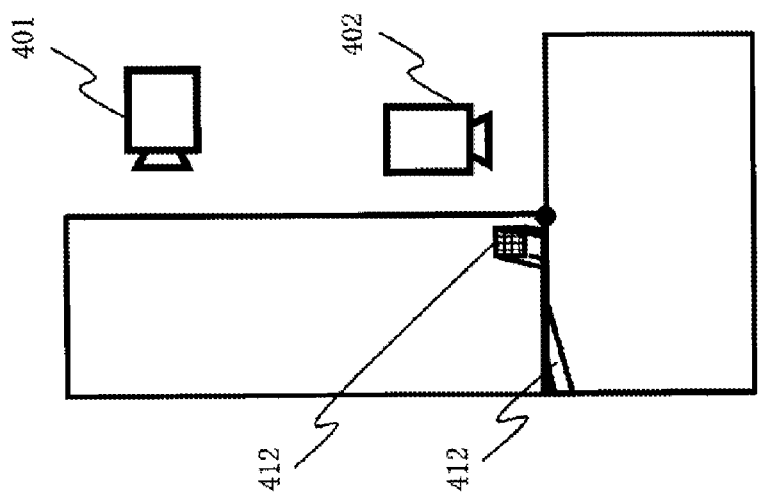
FIGS. 25A to 25C are diagrams illustrating an example of the combined birds-eye-view image when two birds-eye-view images are combined at each joint in the related art.
Figure 25B:
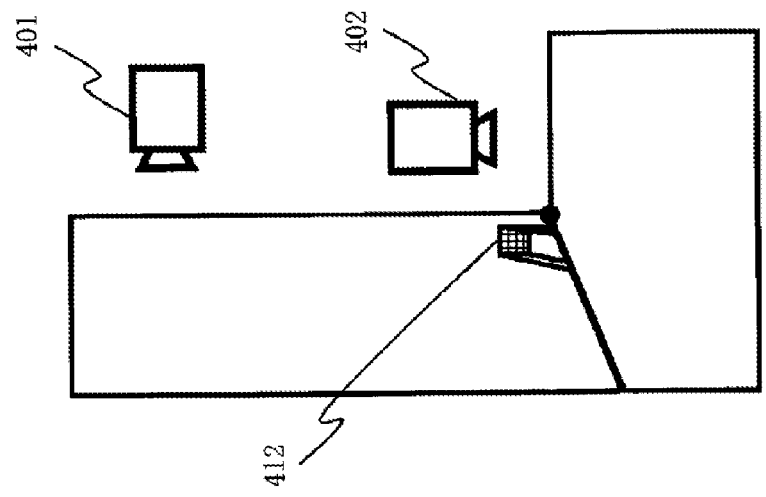
Figure 25A:
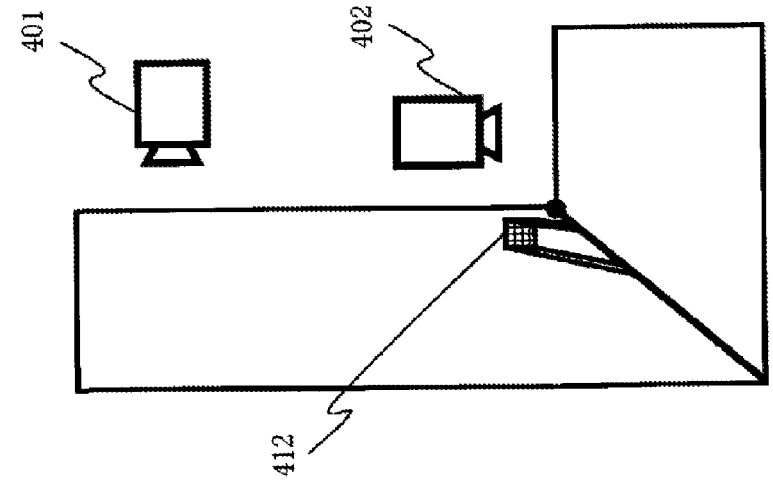

Therefore, unlike in the state described in FIGS. 19C and 19D, a positional relationship between the vehicle itself and the birds-eye-view image, and a positional relationship on the reference height between the birds-eye-view images adjacent to each other can be maintained. Thus, in any birds-eye-view image of the imaging devices, a vertical subject which falls down in a radial direction from the imaging device is not reflected so as to be disconnected over a joint and be discontinuous. For this reason, a subject state or a position of a vehicle is easily recognized without misunderstanding.

In addition, as in an example of the combined birds-eye-view image shown in FIGS. 5A to 5D, any position of the rim of the vehicle image 602 may be set as an end point in an imaging range by two imaging devices regardless of the vehicle image 602 at an angle of view at which the imaging devices can perform imaging, and joints may be disposed within the respective ranges such as ranges 801 to 804.

(Second Embodiment)

A configuration of the birds-eye-view image output system of the present embodiment is the same as the configuration of the birds-eye-view image output system of the first embodiment shown in FIG. 1, and thus description thereof will be omitted.

FIGS. 6A to 6C and FIGS. 7A and 7B show an example of the combined portion of two birds-eye-view images adjacent to each other in the combined birds-eye-view image 603 (refer to FIG. 2B). In the same manner as FIG. 3A, FIG. 6A includes and shows the display range 701 of the birds-eye-view image, the end point 702, the radial line 703, and the radial line 704.

Figure 6C:
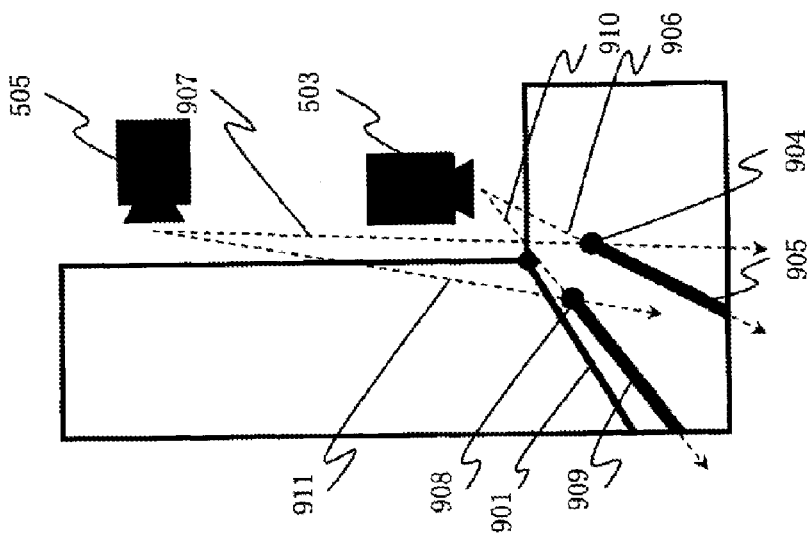
FIGS. 6A to 6C are diagrams illustrating an example of the combined portion of two birds-eye-view images adjacent to each other in a combined birds-eye-view image according to a second embodiment of the present invention.
Figure 6B:
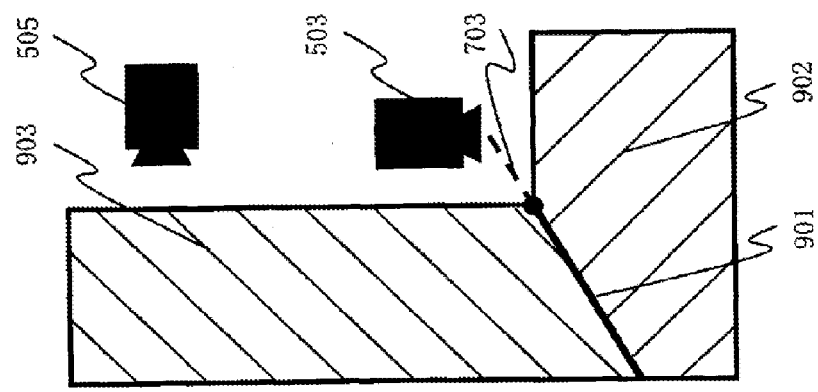
Figure 6A:
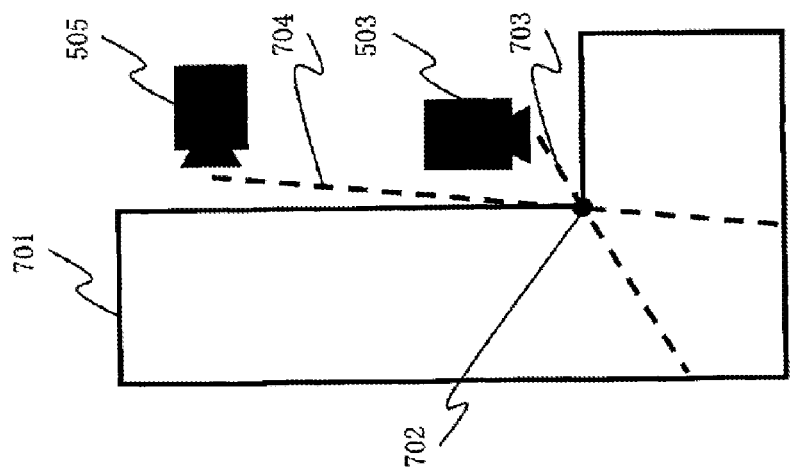
Figure 8B:
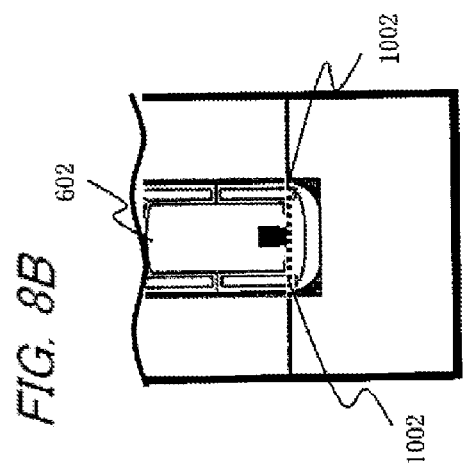
FIGS. 8A to 8D are diagrams illustrating an example of the radial line (joint) which passes through an end point in an angle of view at which an imaging device can perform imaging according to the second embodiment of the present invention.
Figure 8D:
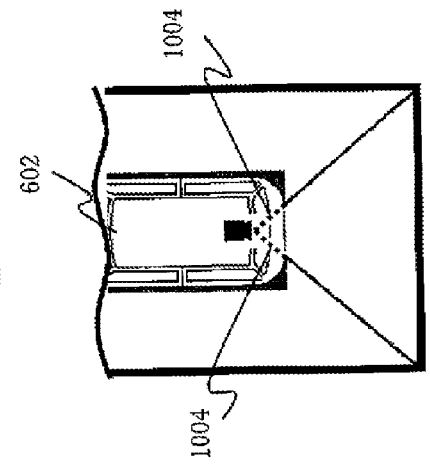
Figure 8A:
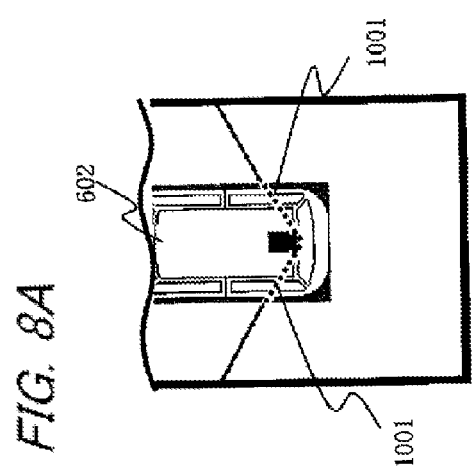
Figure 8C:
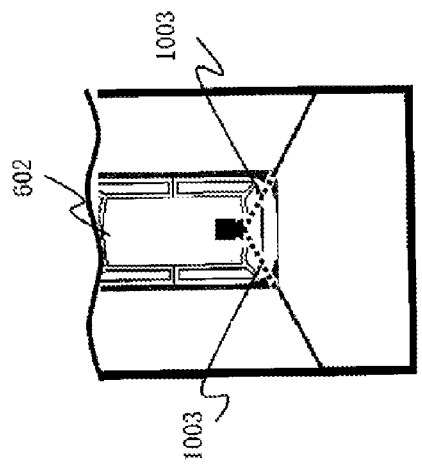

In addition, in the drawings after FIGS. 6A to 6C, the same constituent element as that described previously is given the same reference numeral and detailed description thereof will be omitted.

FIG. 6B shows a display region 902 where a part of the birds-eye-view image of the rear side imaging device 503 is displayed and a display region 903 where a part of the birds-eye-view image of the left side imaging device 505 is displayed when a joint 901 is disposed so as to conform to a direction of the radial line 703 in FIG. 6A, that is, is disposed along the radial line 703.

FIG. 6C is a diagram illustrating a state in which two birds-eye-view images are combined based on the joint 901 of FIG. 6B and vertical subjects 905 and 909 are respectively reflected at positions 904 and 908 on the reference height. The vertical subject 905 reflected at the position 904 falls down in a direction of the radial line 906 passing through the position 904 from the rear side imaging device 503 and in a direction of the radial line 907 passing through the position 904 from the left side imaging device 505. However, the image display device 506 displays only the falling-down in the direction of the radial line 906 depending on the positional relationship between the display region 902 and the display region 903.

The joint 901 is disposed in the direction of the radial line 703 from the position of the rear side imaging device 503. For this reason, the vertical subject 905, which is displayed so as to fall down in the direction of the radial line 906 passing through the position 904 which is not present in the direction of the radial line 703 from the position of the rear side imaging device 503, does not intersect the joint 901.

In addition, the vertical subject 909 reflected at the position 908 falls down in a direction of the radial line 910 passing through the position 908 from the rear side imaging device 503 and in a direction of the radial line 911 passing through the position 908 from the left side imaging device 505. However, the image display device 506 displays only the falling-down in the direction of the radial line 910 depending on the positional relationship between the region 902 and the region 903.

The joint 901 is disposed in the direction of the radial line 703 from the position of the rear side imaging device 503. For this reason, in the same manner as the vertical subject 905, the vertical subject 909, which is displayed so as to fall down in the direction of the radial line 910 passing through the position 908 which is not present in the direction of the radial line 703 from the position of the rear side imaging device 503, does not intersect the joint 901.

As in the example of FIGS. 6A to 6C, in a case where the joint 901 is disposed so as to conform to the direction of the radial line 703 from the position of the rear side imaging device 503, the displayed falling-down does not occur in a direction crossing the joint 901 even if the vertical subjects 905 and 909 are reflected at any position of the display region 902 on which the birds-eye-view image of the rear side imaging device 503 is displayed.

On the other hand, when a joint does not conform to the direction of the radial line 703 from the position of the rear side imaging device 503, falling-down of a vertical subject may occur in a direction crossing the joint even in the display region on which a part of the birds-eye-view image of the rear side imaging device 503 is displayed. In FIGS. 3B and 3C described above, this does not occur due to the positional relationship between the joint 706 and the vertical subject 710, but this may occur depending on a positional relationship between a joint and a vertical subject. This will be supplementarily described with reference to FIGS. 7A and 7B.

FIG. 7A shows a region 913 where a part of the birds-eye-view image of the rear side imaging device 503 is displayed and a region 914 where a part of the birds-eye-view image of the left side imaging device 505 is displayed when a joint 912 is disposed so as to conform to neither of the radial line 703 and the radial line 704, in the region 705.

FIG. 7B is a diagram illustrating a state in which two birds-eye-view images are combined based on the joint 912 of FIG. 7A and vertical subjects 905 and 909 are respectively reflected at positions 904 and 908 on the same reference height as in FIG. 6C.

The vertical subject 905 reflected at the position 904, which falls down in one direction of the radial line 906, in the same manner as FIG. 6C, is displayed, but is disconnected at a position of the intersection 915 between the joint 912 and the radial line 906. At this time, the vertical subject 905 which is displayed so as to fall down in the direction of the radial line 906 from the position of the rear side imaging device 503 intersects the joint 912.

In addition, the vertical subject 909 reflected at the position 908 falls down in a direction of the radial line 910 passing through the position 908 from the rear side imaging device 503 and in a direction of the radial line 911 passing through the position 908 from the left side imaging device 505. However, the image display device 506 displays only the falling-down in the direction of the radial line 911 depending on the positional relationship between the display region 913 and the display region 914. At this time, the vertical subject 909 does not intersect the joint 912 but is not parallel with the radial line 911 and the joint 912 and thus intersects the joint out of the display regions 913 and 914 (refer to FIG. 7A).

As in the example of FIGS. 7A and 7B, the extending direction of the joint 912 does not conform to the direction of the radial line 906 from the position of the rear side imaging device 503. The position of the rear side imaging device 503 is a base point of the falling-down direction of the vertical subject 905 of the display region 913. For this reason, there are cases where falling-down crosses the joint 912 depending on a position of the vertical subject 905. In this case, the vertical subject 905 is disconnected and disappears in the middle within a range included in the birds-eye-view image.

As described above, in the birds-eye-view image generation device 501 of the present embodiment, the joint setting unit 54 sets the joint 901 along either one of directions (radial directions) of two radial lines 703 and 704 in two birds-eye-view images. In this case, in a range included in the birds-eye-view image of the rear side imaging device 503 which is used as a reference of the direction of the radial line 703 to which the joint 901 conforms (follows), falling-down of the vertical subject does not occur in a direction crossing the joint 901 in any position. Thereby, the subject is largely displayed without being disconnected and disappearing in the middle in a range included in the birds-eyeview image of the inverse quantization unit 503. Therefore, the presence of the subject is easily recognized.

In addition, as in an example of the combined birds-eye-view image shown in FIGS. 8A to 8D, any position of the rim of the vehicle image 602 may be set as an end point in an imaging range by two imaging devices regardless of the vehicle image 602 at an angle of view at which the imaging devices can perform imaging, and joints may be disposed within the respective ranges such as ranges 1101 to 1104.

(Third Embodiment)

A configuration of the birds-eye-view image output system of the present embodiment is the same as the configuration of the birds-eye-view image output system of the first embodiment shown in FIG. 1, and thus description thereof will be omitted.

Figure 9A:
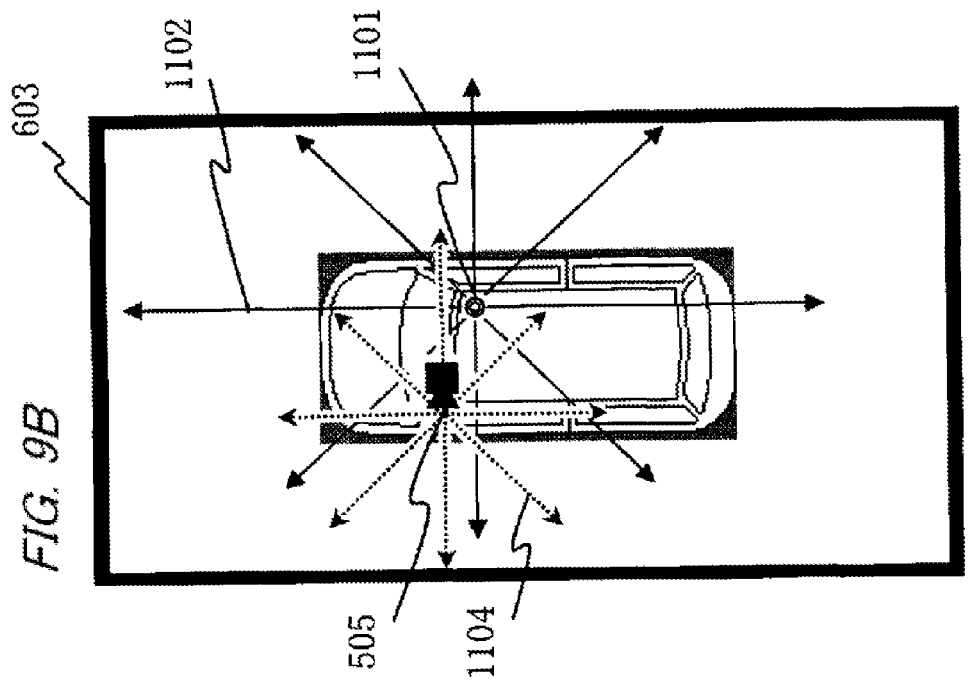
FIGS. 9A and 9B are diagrams illustrating an example of the line of sight direction of a driver and the falling-down direction of a subject in a combined birds-eye-view image according to a third embodiment of the present invention.
Figure 9B:
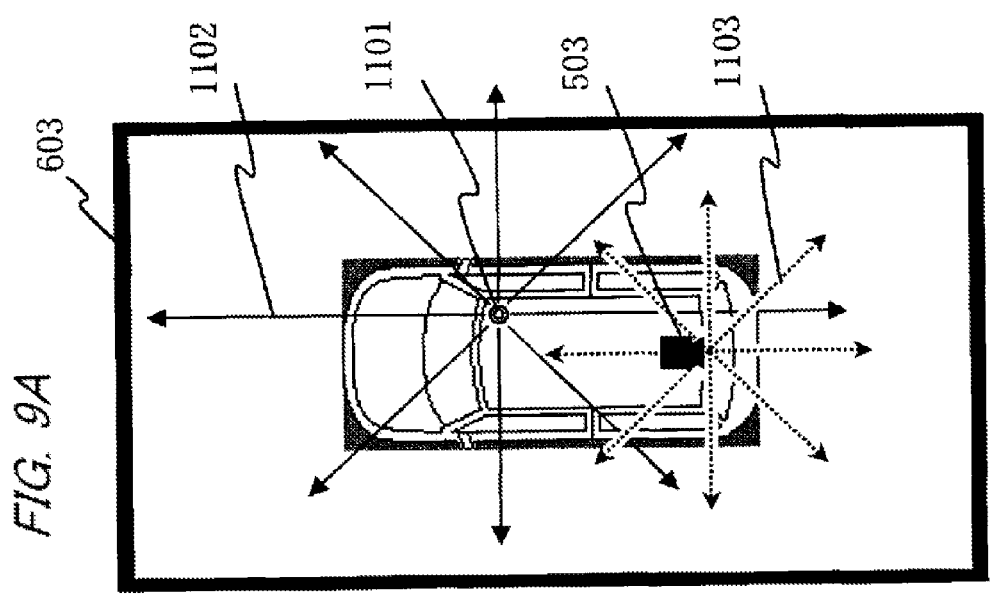

FIGS. 9A and 9B and FIGS. 10A and 10B are diagrams illustrating an example of the combined birds-eye-view image 603. FIG. 9A shows a relationship between a radial line 1102 indicating a line of sight direction from a position of a driver 1101, and a radial dotted line 1103 indicating a falling-down direction when a vertical subject is reflected in a birds-eye-view image of the rear side imaging device 503. In addition, FIG. 9B shows a relationship between the radial line 1102 indicating a line of sight direction from the position of the driver 1101, and a radial dotted line 1104 indicating a falling-down direction when a vertical subject is reflected in a birds-eye-view image of the left side imaging device 505.

Figure 10B:
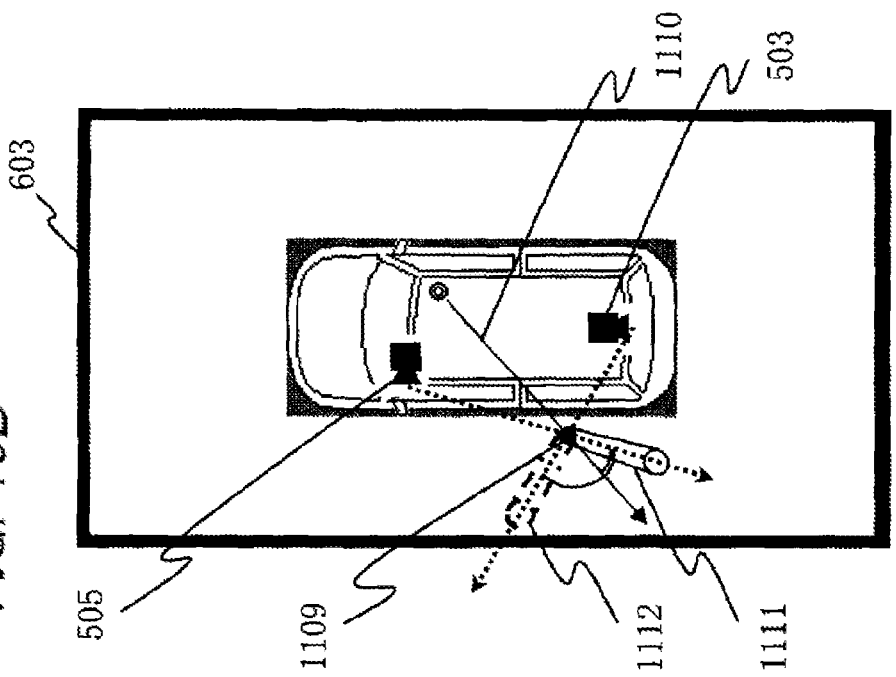
FIG. 10B is a diagram illustrating an example of the line of sight direction of a driver and the falling-down direction of a subject in a combined birds-eye-view image according to the third embodiment of the present invention.
Figure 10A:
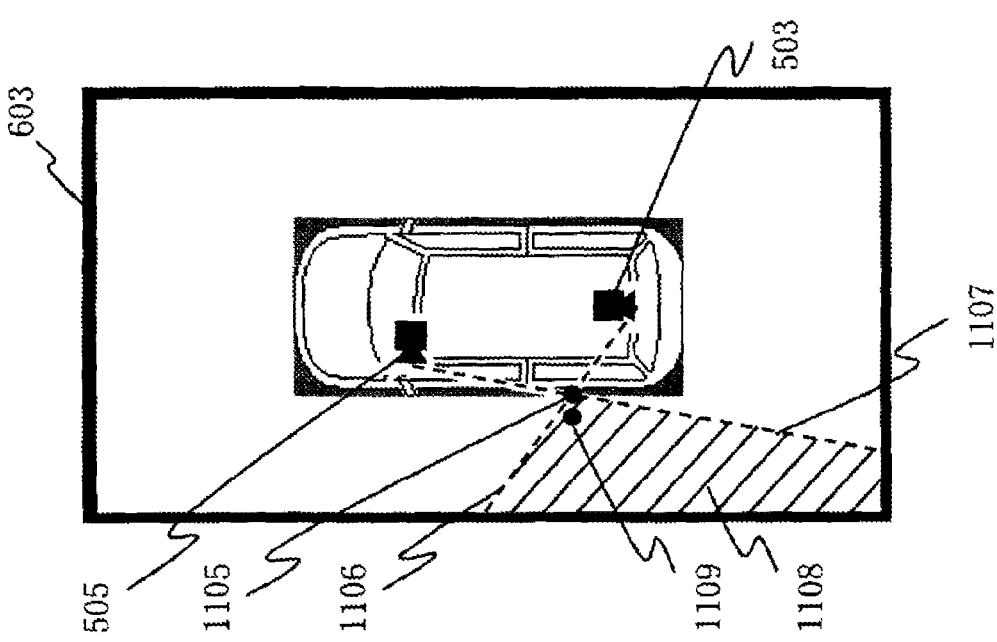
FIG. 10A is a diagram illustrating an example of the range between two radial lines directed to an end point from an imaging device in an imaging range by two imaging devices according to the third embodiment of the present invention.

As shown in FIG. 10A, an end point 1105 of a joint close to the imaging device is disposed. In a case where there is a vertical subject at a point 1109 in a range 1108 surrounded by a radial line 1106 passing through the position of the end point 1105 from the position of the rear side imaging device 503, a radial line 1107 passing through the position of the end point 1105 from the position of the left side imaging device 505, and a range included in the combined birds-eye-view image, a condition in which a joint is disposed in any radial direction from the end point 1105 will be examined.

In this case, as shown in FIG. 10B, when a joint is disposed such that a birds-eye-view image of the left side imaging device 505 is displayed at the point 1109, falling-down of the vertical subject in a direction 1111 (in a direction of the end point 1105 from the left side imaging device 505) close to the line of sight direction 1110 of the driver is displayed. On the other hand, falling-down in a direction 1112 (in a direction of the end point 1105 from the rear side imaging device 503) distant from 1110 is not displayed. Around the point 1109, only a birds-eye-view image is displayed in which a falling-down direction of the subject is close to a line of sight direction in which the driver views the vertical subject from the driver's seat.

In addition, as can be understood from FIG. 10B, the fact that the line of sight direction is close to the falling-down direction indicates that an angle formed by the line of sight direction and the falling-down direction is smaller, and the fact that the line of sight direction is distant from the falling-down direction indicates that an angle formed by the line of sight direction and the falling-down direction is larger.

As described above, in the birds-eye-view image generation device 501 of the present embodiment, the joint setting unit 54 sets a joint in a direction close to the radial line 1107 from the line of sight direction 1110 when a first angle formed by the line of sight direction 1110 of the driver 1101 of the vehicle and the direction of the radial line 1107 (a first radial direction) is smaller than a second angle formed by the line of sight direction 1110 and the direction of the radial line 1106 (a second radial direction) in two birds-eye-view images.

In this case, the birds-eye-view image side in which the falling-down direction of the vertical subject is close to the line of sight direction of the driver is displayed, and the birds-eye-view image side in which the falling-down direction of the vertical subject is distant from the line of sight direction of the driver is not displayed. Thereby, only the birds-eye-view image is displayed in which the falling-down direction of the subject is close to the line of sight direction 1110 in which the driver 1101 views the vertical subject from the driver's seat. Therefore, a direction in which a subject is present with respect to a driver is easily recognized.

(Fourth Embodiment)

A configuration of the birds-eye-view image output system of the present embodiment is the same as the configuration of the birds-eye-view image output system of the first embodiment shown in FIG. 1, and thus description thereof will be omitted.

FIGS. 11A to 11C are diagrams illustrating an example of a part of the combined birds-eye-view image 603 (refer to FIG. 2B). FIG. 11A shows that end points 1201 of joints close to the imaging devices are respectively located on sides indicating the left end and the right end of the vehicle image 602, and joints 1202 extend from the respective end points 1201. In addition, the left end and the right end here do not include corner portions.

Here, it is assumed that the height direction of the rear side imaging device 503 is a relatively short distance with respect to the vehicle, that is, the height thereof is substantially the same as the height of the vehicle. In addition, it is assumed that the rear side imaging device 503 is located as at a rear end side as possible among the left, right and center of the vehicle. Further, it is assumed that the rear side imaging device is mounted on a typical layout arrangement such that the vehicle and the ground are reflected (the vehicle and the ground are included in the imaging range of the rear side imaging device 503).

In a case where a vehicle with a height from the reference height is projected in a birds-eye-view image of the rear side imaging device 503, and thereby the vehicle is viewed vertically downward from the top (a virtual viewpoint of the birds-eye-view image), a vehicle rear direction of which a distance to a vehicle reflected in the rear side imaging device 503 is short has no deviation in most cases. On the other hand, a vehicle crosswise direction of which a distance to a vehicle reflected in the rear side imaging device 503 is long is considerably deviated, and thus the vehicle is reflected in a region 1203.

When the vehicle is deviated and is reflected in the region 1203, as can be seen from FIG. 11A, there is a location where continuity of a subject on the reference height between the rear side imaging device 503 and the left side imaging device 505 or the rear side imaging device 503 and the right side imaging device 504 is lost over the joint 1202. In addition, a reflection of the vehicle including the side indicating the vehicle rear end is adjacent to the side indicating the side end of the vehicle image 602, and thereby a directionality (that is, in which direction the subject is present when viewed from the vehicle) of the subject with respect to the vehicle is also lost.

In addition, FIG. 11B shows that respective end points 1204 of joints close to the imaging devices are located on the side indicating the rear end of the vehicle image 602, and joints 1205 extend from the respective end points 1204.

Here, it is assumed that the height direction of the left side imaging device 505 and the right side imaging device 504 is a relatively short distance with respect to the vehicle, that is, the height of the left side imaging device 505 or the right side imaging device 504 is substantially the same as the height of the vehicle. In addition, it is assumed that the left side imaging device 505 and the right side imaging device 504 are located as at a left end side or a right end side of the vehicle as possible. Further, it is assumed that the left side imaging device or the right side imaging device is mounted on a typical layout arrangement such that the vehicle and the ground are reflected (the vehicle and the ground are included in the imaging range of the left side imaging device 505 or the right side imaging device 504).

In this case, when a vehicle with a height from the reference height is projected in a birds-eye-view image of the left side imaging device 505 or the right side imaging device 504, and thereby the vehicle is viewed vertically downward from the top, a position thereof may be deviated in the birds-eye-view image. Here, when the vehicle top (a virtual viewpoint of a birds-eye-view image) is used as a reference, a vehicle crosswise direction of which a distance to a vehicle reflected in the left side imaging device 505 or the right side imaging device 504 is short has no deviation in most cases. On the other hand, a vehicle front-back direction of which a distance to a vehicle reflected in the left side imaging device 505 or the right side imaging device 504 is long is considerably deviated, and thus the vehicle is reflected in a region 1206 or a region 1207.

When the vehicle is deviated and reflected in the region 1206 or the region 1207, as can be seen from FIG. 11B, there is a location where continuity of a subject on the reference height between the rear side imaging device 503 and the left side imaging device 505 or the rear side imaging device 503 and the right side imaging device 504 is lost over the joint 1205. In addition, a reflection of the vehicle including the side indicating the vehicle rear end is adjacent to the side indicating the rear end of the vehicle image 602, and thereby a directionality (that is, in which direction the subject is present when viewed from the vehicle) of the subject for the vehicle is also lost.

Meanwhile, FIG. 11C shows that an end point 1208 of a joint 1209 for combining birds-eye-view images of the rear side imaging device 503 and the left side imaging device 505 is disposed so as to be located at a corner of the sides of the vehicle image 602.

In FIG. 11C, the vehicle on a birds-eye-view image generated from a captured image of the rear side imaging device 503, reflected in the region 1203 so as to be considerably deviated in FIG. 11A, and the vehicle on a birds-eye-view image generated from a captured image of the left side imaging device 505 or the right side imaging device 504, reflected in the region 1206 so as to be considerably deviated in FIG. 11B, are not displayed.

As in the example of FIGS. 11A and 11B, if the end point of the joint close to the imaging device is disposed so as to be deviated from the corner of the sides of the vehicle image 602, the display regions of two birds-eye-view images are adjacent to the side indicating one rear end or side end of the vehicle image 602, and thus there is a probability that a vehicle which is reflected so as to be considerably deviated from a practical position may be displayed when viewed vertically downward from the vehicle top. On the other hand, as in the example of FIG. 11C, if the end point is disposed at the corner of the sides of the vehicle image 602, the display region of a single birds-eye-view image is adjacent to the side indicating one rear end or side end of the vehicle image 602, and it is difficult for a vehicle which is reflected so as to be considerably deviated, to be displayed.

In addition, the rear end of the vehicle here corresponds to the rear end (lower end) of the vehicle image 602 in FIGS. 11A to 11C. Further, the side end of the vehicle here corresponds to the side end (the left end or the right end) of the vehicle image 602 in FIGS. 11A to 11C.

Figure 12:
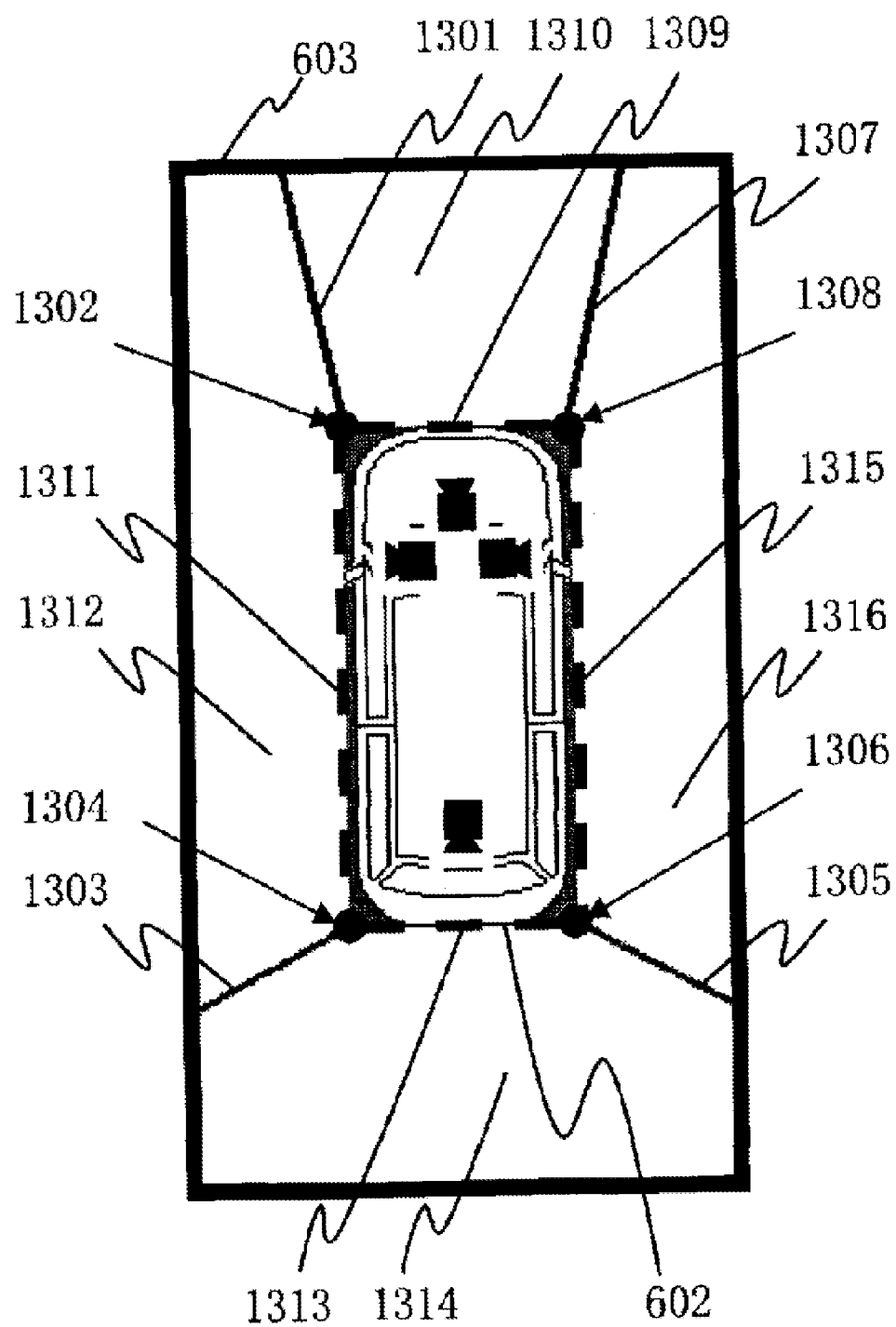
FIG. 12 is a diagram illustrating an example of the combined birds-eye-view image when an end point of each joint is located at a corner portion of the vehicle image according to the fourth embodiment of the present invention.

Further, as shown in FIG. 12, a joint 1301 is disposed using a corner 1302 of the sides of the vehicle image 602 as an end point of the joint 1301 close to the imaging device. A joint 1303 is disposed using a corner 1304 of the sides of the vehicle image 602 as an end point of the joint 1303 close to the imaging device. A joint 1305 is disposed using a corner 1306 of the sides of the vehicle image 602 as an end point of the joint 1305 close to the imaging device. A joint 1307 is disposed using a corner 1308 of the sides of the vehicle image 602 as an end point of the joint 1307 close to the imaging device.

In this case, one entire side indicating a part of the rim of the display region 1310 on which a part of the birds-eye-view image of the front side imaging device 502 is displayed is adjacent to the entire side 1309 indicating the front end of the vehicle image 602. One entire side indicating a part of the rim of the display region 1312 on which a part of the birds-eye-view image of the left side imaging device 505 is displayed is adjacent to the entire side 1311 indicating the left end of the vehicle image 602. One entire side indicating a part of the rim of the display region 1314 on which a part of the birds-eye-view image of the rear side imaging device 503 is displayed is adjacent to the entire side 1313 indicating the rear end of the vehicle image 602. One entire side indicating a part of the rim of the display region 1316 on which a part of the birds-eye-view image of the right side imaging device 504 is displayed is adjacent to the entire side 1315 indicating the right end of the vehicle image 602.

As in the example of FIG. 12, if the end points of the joints close to the imaging devices are disposed at all the corners (each corner at which the sides of the display regions on which a portion of two birds-eye-view images adjacent to each other in a combined arrangement is displayed intersect each other) of the sides of the vehicle image 602, and the combined birds-eye-view image 603 is generated, the display region on which a part of a single birds-eye-view image is displayed is adjacent to one side of the vehicle image 602. For this reason, each side of the vehicle image 602 conforms to the directionality of each birds-eye-view image for the vehicle.

In addition, the joint of the combined birds-eye-view image 603 displayed by the image display device 506 has a predetermined width, and this enables the driver to view and clearly recognize the gap of the birds-eye-view images.

As described above, in the birds-eye-view image generation device 501 of the present embodiment, the joint setting unit 54 sets the corner portion of the vehicle image 602 as an end point in two birds-eye-view images. In this case, since a corner at which two sides close to the imaging device intersect each other is set as an end point of the joint in the display regions of which a portion of the two birds-eye-views images are displayed, only a single display region of a birds-eye-view image generated from the imaging device of which a position is closest to one side of the vehicle image 602 is adjacent to the one side of the vehicle image 602 in the combined birds-eye-view image 603 of the vehicle periphery.

Thereby, in a range of the display region on which a part of the birds-eye-view image is displayed, it is difficult for a vehicle with a height from the reference height to be displayed, and an unnecessary reflection of the vehicle itself is easily removed. In addition, one side of the vehicle image 602 conforms to a direction of the birds-eye-view image, and thus a direction in which a subject is present with respect to the vehicle is easily recognized.

(Fifth Embodiment)

Figure 13:
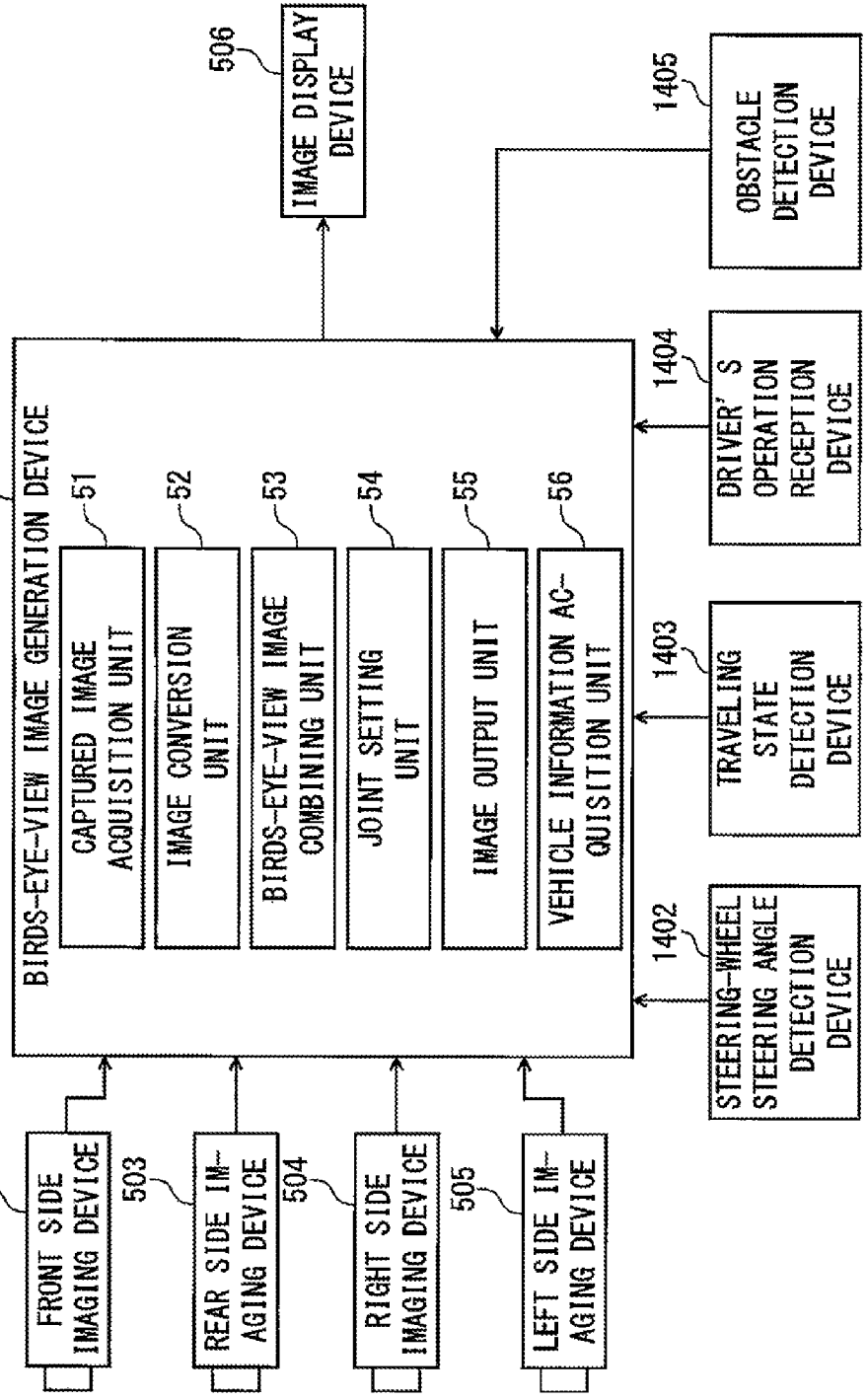
FIG. 13 is a block diagram illustrating a configuration example of the birds-eye-view image output system according to a fifth embodiment of the present invention.

FIG. 13 is a block diagram illustrating a configuration example of the birds-eye-view image output system according to a fifth embodiment of the present invention.

The birds-eye-view image generation device 1401 is mounted on, for example, a vehicle, and performs various processes such as a process of generating a birds-eye-view image. A steering-wheel steering angle detection device 1402 detects a straight traveling state, a turn-left state, a turn-right state, or a rotation angle of a steering wheel of the vehicle, so as to be output to the birds-eye-view image generation device 1401. A traveling state detection device 1403 detects information such as whether or not the vehicle is driven in a forward state or a backward state so as to be output to the birds-eye-view image generation device 1401. A driver's operation reception device 1404 receives information which is input by a driver through an input device (not shown) installed in the vehicle, and output the information to the birds-eye-view image generation device 1401. An obstacle detection device 1405 detects an obstacle from a captured image or the like acquired by a sonar or an imaging device mounted on the vehicle, and output information thereof to the birds-eye-view image generation device 1401. These devices are electrically connected to each other.

As shown in FIG. 13, the birds-eye-view image generation device 1401 is connected to the front side imaging device 502, the rear side imaging device 503, the right side imaging device 504, the left side imaging device 505, the steering-wheel steering angle detection device 1402, the traveling state detection device 1403, the driver's operation reception device 1404, and the obstacle detection device 1405 on the input side, and is connected to the image display device 506 on the output side.

In addition, the birds-eye-view image generation device 1401 includes a vehicle information acquisition unit 56 which acquires vehicle information of the vehicle in which the birds-eye-view image generation device 1401 is mounted, in addition to the configuration portion realizing the function of the birds-eye-view image generation device 501 as shown in FIG. 1. The vehicle information acquisition unit 56 acquires a variety of vehicle information from the steering-wheel steering angle detection device 1402, the traveling state detection device 1403, the driver's operation reception device 1404, and the obstacle detection device 1405, via a line or a cable in a wired or wireless manner.

Figure 14A:
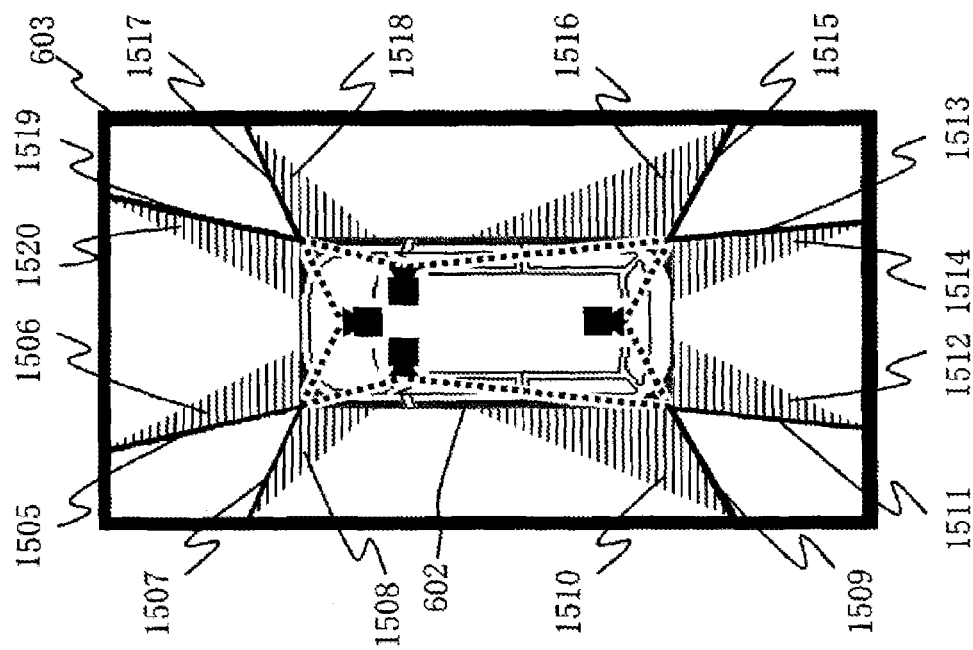
FIGS. 14A and 14B are diagrams illustrating an example of the range between two radial lines directed to an end point from an imaging device in an imaging range by two imaging devices according to the fifth embodiment of the present invention.

Next, FIGS. 14A and 14B, FIGS. 15A and 15B, FIGS. 16A and 16B, and FIG. 17 are diagrams illustrating an example of the combined birds-eye-view image 603 (refer to FIG. 6B). FIG. 14A shows ranges 1501 to 1504 in which respective joints may be located in a case where the joints are disposed in any radial directions by using respective corners of the vehicle image 602 as end points of the joints close to the imaging devices.

The birds-eye-view image generation device 1401 can acquire a variety of vehicle information as described above in real time during a driving operation, by using the steering-wheel steering angle detection device 1402, the traveling state detection device 1403, the driver's operation reception device 1404, and the obstacle detection device 1405. Thereby, the joint setting unit 54 can switch joints to optimal positions in the ranges 1501 to 1504 depending on usages or peripheral circumstances of the vehicle.

Figure 14B:
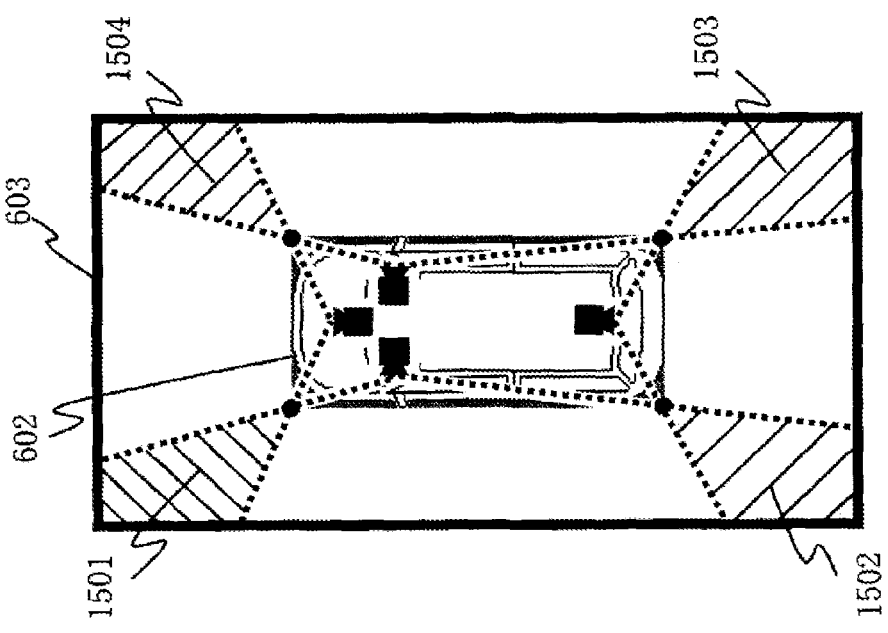

FIG. 14B shows a case where joints are disposed at boundary positions (one of sides which are rims of the range 1501) in the ranges 1501 to 1504. Two joints are present for each corner of the vehicle image 602.

Here, it is assumed that a vertical subject is reflected at a position of the reference height of each region, in a region 1506 for a joint 1505, in a region 1508 for a joint 1507, in a region 1510 for a joint 1509, in a region 1512 for a joint 1511, in a region 1514 for a joint 1513, in a region 1516 for a joint 1515, in a region 1518 for a joint 1517, and in a region 1520 for a joint 1519.

In this case, since falling-down of a subject occurs in a direction crossing the joint in the display region of the birds-eye-view image, there is a probability that the display in the height direction of the subject may be disconnected and disappear due to influence thereof.

Based on this, when the vehicle moves backward, since the background flows in a direction (upward in the figure) of the arrows 1521 on the combined birds-eye-view image 603 as shown in FIG. 15A, the driver desires to visually recognize the regions 1522 sides most, and thus it is prioritized to enable a vertical subject not to be disconnected and disappear inside the display regions of the birds-eye-view images in the regions 1522. In this case, as shown in FIG. 15B, preferably, the regions which are disposed at the joints 1505, 1509, 1515 and 1519 and in which falling-down of the subject occurs in directions crossing the joints 1505, 1509, 1515 and 1519 do not overlap the regions 1522.

In addition, when the vehicle moves forward, since the background flows in a direction (downward in the figure) of the arrows 1523 on the combined birds-eye-view image 603 as shown in FIG. 16A, the driver desires to visually recognize the regions 1524 sides most, and thus it is prioritized to enable a vertical subject not to be disconnected and disappear inside the display regions of the birds-eye-view images in the regions 1524.

In this case, as shown in FIG. 16B, preferably, the regions which are disposed at the joints 1507, 1511, 1513 and 1517 and in which falling-down of the subject occurs in directions crossing the joints 1507, 1511, 1513 and 1517 do not overlap the regions 1524.

Figure 17:
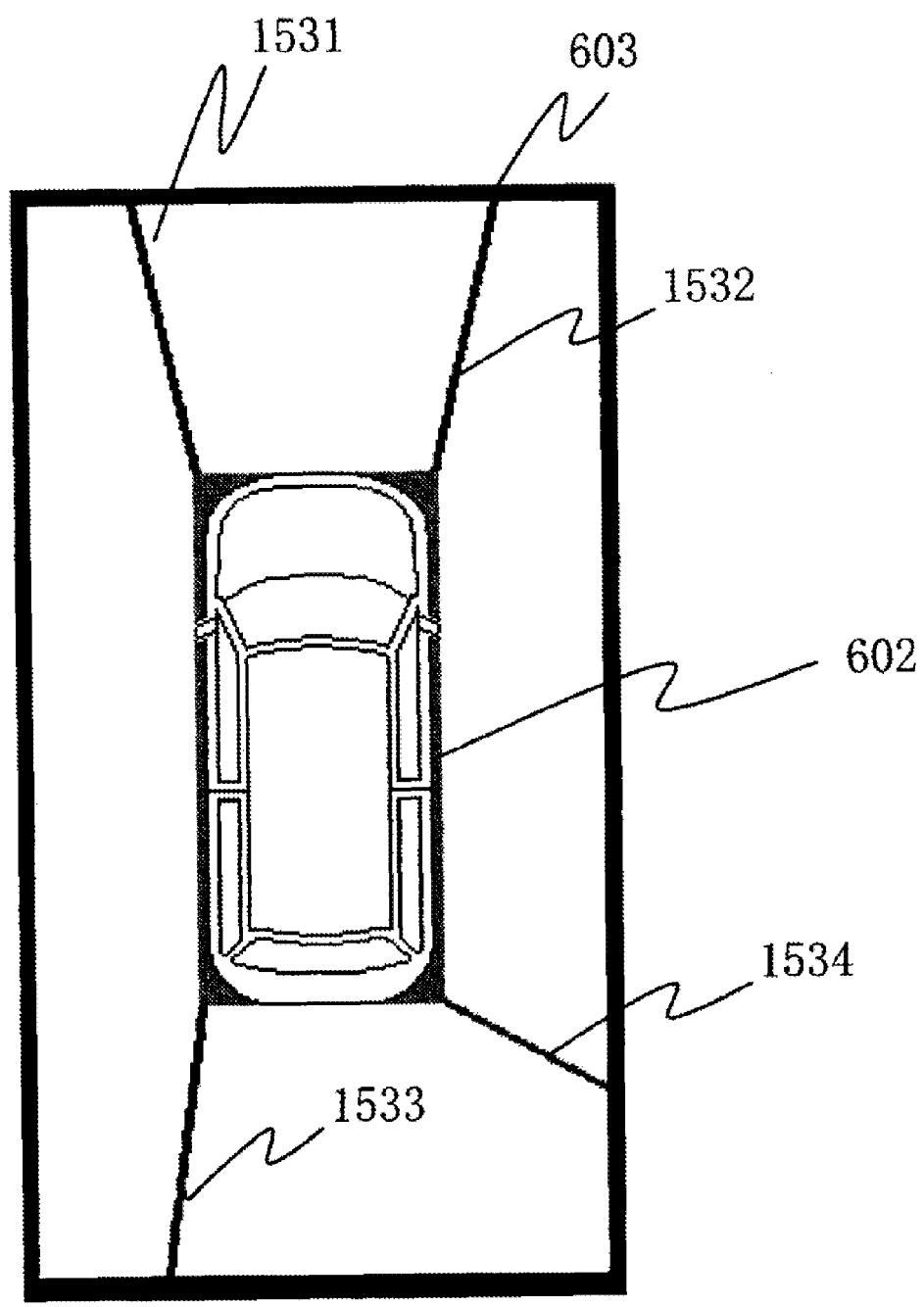
FIG. 17 is a diagram illustrating an example of the combined birds-eye-view image when joints are horizontally asymmetrical according to the fifth embodiment of the present invention.

In addition, in a case of changing (including setting) a position of the joint, as in FIG. 17, joints 1531 to 1534 may not be horizontally symmetrical.

As described above, the birds-eye-view image generation device 501 of the present embodiment includes the vehicle information acquisition unit 56 which acquires vehicle information of the vehicle in which the birds-eye-view image generation device 501 is mounted. The joint setting unit 54 sets a joint on the basis of the acquired vehicle information. In this case, a joint is changed between two radial directions directed to the end point from the positions of the imaging devices depending on vehicle information. For example, a joint is set so as to avoid a region on a traveling direction side (for example, a rear side when moving backward) of the vehicle, and regions in an opposite direction (for example, a front left and right sides when moving backward) to the traveling direction in a direction perpendicular to the traveling direction. Thereby, joints can be switched to optimal states depending on usages or peripheral circumstances of the vehicle. Therefore, a subject state or a position of the vehicle is easily recognized without misunderstanding.

(Sixth Embodiment)

A configuration of the birds-eye-view image output system of the present embodiment is the same as the configuration of the birds-eye-view image output system of the first embodiment shown in FIG. 1, and thus description thereof will be omitted.

Figure 18:
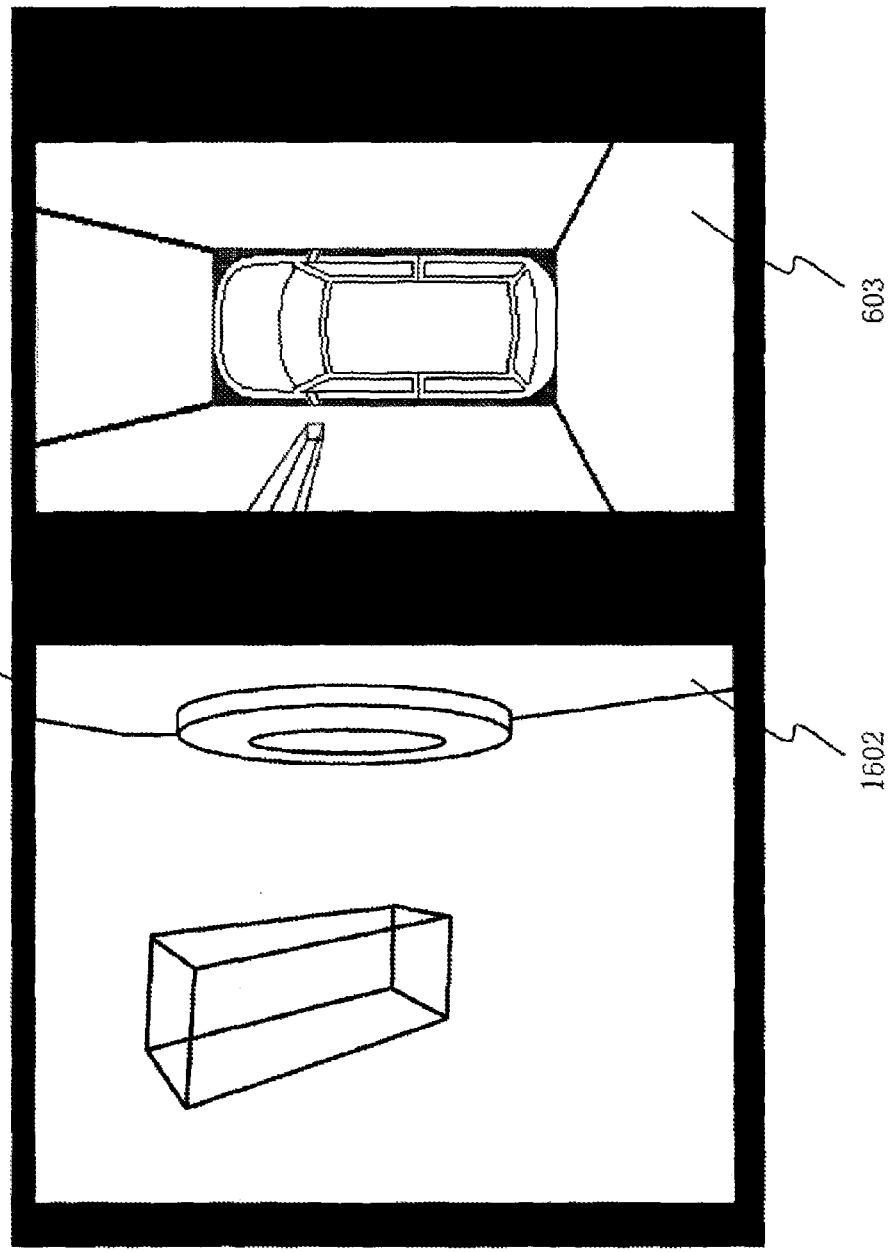
FIG. 18 is a diagram illustrating an example of the output image of a birds-eye-view image generation device according to a sixth embodiment of the present invention.

FIG. 18 is a diagram illustrating an example of the output image of the birds-eye-view image generation device 1401. As an output image 1601 shown in FIG. 18, the combined birds-eye-view image 603 and a viewpoint-converted image different from the combined birds-eye-view image 603 are simultaneously output. The viewpoint-converted image may be at least a part of a birds-eye-view image, may be at least a part of a captured image acquired by the imaging device, or may be images other than this. In FIG. 18, in the output image 1601, the combined birds-eye-view image 603 is disposed on the right part, and the viewpoint-converted image of the left part of the vehicle in which the vehicle 1602 is reflected is disposed on the left part.

The output image 1601 is output to the image display device 506 by the image output unit 55 included in the birds-eye-view image generation device 1401. The image display device 506 simultaneously displays a plurality of images included in the output image.

In addition, the disposition of each image in the output image 1601 may be changed in consideration of usages of the image which is output at the same time as the combined birds-eye-view image, a directionality of the output image for the vehicle (which part is indicated by the image), and the like.

As described above, the birds-eye-view image generation device 501 of the present embodiment includes the image output unit 55 which simultaneously outputs a combined birds-eye-view image (a first image) combined by the birds-eye-view image combining unit 53 and a captured image acquired by the captured image acquisition unit 51 or a birds-eye-view image (a second image) converted by the image conversion unit 52. In other words, the combined birds-eye-view image, and the second image which has a viewpoint different from the combined birds-eye-view image or displays a portion which is not displayed in the combined birds-eye-view image, may be simultaneously output.

Thereby, it is possible to improve visibility of a solid body which is considerably deformed and is thus hard for a driver to recognize on a combined birds-eye-view image in an image displayed on the image display device 506. In addition, it is possible to obtain a wide field of view in a case of display a portion which is not displayed in the combined birds-eye-view image. As above, the visibility is supplemented by the second image.

While the present invention has been described in detail, or with reference to the specific embodiments, it is apparent for those skilled in the art that the invention may be modified and changed in various manners without departing from the scope and spirit of the invention.

The present application is based on Japanese Patent Application No. 2011-217954 filed on Sep. 30, 2011, the entire content of which is incorporated by reference herein.

The present invention is suitable for a birds-eye-view image generation device, a birds-eye-view image generation method, a birds-eye-view image generation program, and the like, capable of recognizing a position or a shape of a subject with high accuracy in a combined birds-eye-view image.

What is claimed is:

1. A birds-eye-view image generation device comprising:
a CPU and a non-volatile memory storing a program, wherein, when the program is executed by the CPU, the program causes the CPU to function as:
 a captured image acquisition unit configured to acquire captured images which are respectively captured by a plurality of imaging devices mounted on a vehicle;
 an image conversion unit configured to convert the captured images acquired by the captured image acquisition unit into birds-eye-view images through a viewpoint conversion process;
 a birds-eye-view image combining unit configured to combine the plurality of birds-eye-view images converted by the image conversion unit; and
 a joint setting unit configured to:
  set any position of a rim of a vehicle image corresponding to a vehicle included in the birds-eye-view images, as an end point, in an overlapping imaging range in two birds-eye-view images corresponding to first and second imaging devices of which imaging ranges overlap each other;
  determine an area in the overlapping image between a first line and a second line, the first line extending from the first imaging device and passing the end point in a direction on an opposite side to the vehicle image, and the second line extending from the second imaging device and passing the end point in a direction on the opposite side to the vehicle image; and
  set a joint line which extends within the area in any direction on the opposite side to the vehicle image so that the two birds-eye-view images are combined at the joint line by the birds-eye-view image combining unit,
 two birds-eye-view images are combined without overlapping each other,
 the joint setting unit is configured to set the joint in either one of the two radial directions in the two birds-eye-view images, and
 the joint setting unit is configured to set the joint in a direction close to a first radial direction from a line of sight direction of a driver of the vehicle when a first angle formed by the line of sight direction and the first radial direction is smaller than a second angle formed by the line of sight direction and a second radial direction.

2. The birds-eye-view image generation device according to claim 1,
wherein the joint setting unit is configured to set a corner portion of the vehicle image as the end point in the two birds-eye-view images.

3. The birds-eye-view image generation device according to claim 1, wherein the program further causes the CPU to function as:
 a vehicle information acquisition unit configured to acquire vehicle information of the vehicle,
 wherein the joint setting unit is configured to set the joint on the basis of the vehicle information acquired by the vehicle information acquisition unit.

4. The birds-eye-view image generation device according to claim 3,
wherein the vehicle information acquisition unit is configured to acquire the vehicle information including a traveling direction of the vehicle, and
wherein the joint setting unit is configured to set the joint so as to avoid a region on a traveling direction side of the vehicle, and regions in an opposite direction to the traveling direction in a direction perpendicular to the traveling direction.

5. The birds-eye-view image generation device according to claim 1, wherein the program further causes the CPU to function as:
an image output unit configured to simultaneously output a combined birds-eye-view image which is combined by the birds-eye-view image combining unit and the captured image which is acquired by the captured image acquisition unit or the birds-eye-view image which is converted by the image conversion unit.

6. A birds-eye-view image generation method of a birds-eye-view image generation device, comprising:
acquiring captured images which are captured by a plurality of imaging devices;
converting the acquired captured images into birds-eye-view images through a viewpoint conversion process;
combining the plurality of converted birds-eye-view images; and
setting any position of a rim of a vehicle image corresponding to a vehicle included in the birds-eye-view image, as an end point, in an overlapping imaging range in two birds-eye-view images corresponding to first and second imaging devices of which imaging ranges overlap each other;
determining an area in the overlapping image between a first line and a second line, the first line extending from the first imaging device and passing the end point in a direction on an opposite side to the vehicle image, and the second line extending from the second imaging device and passing the end point in a direction on the opposite side to the vehicle image; and
setting a joint line which extends within the area in any direction on the opposite side to the vehicle image so that the two birds-eye-view images are combined at the joint line in the combining the plurality of converted birds-eye-view images,
wherein two birds-eye-view images are combined without overlapping each other,
the joint is set in either one of the two radial directions in the two birds-eye-view images, and
the joint is set in a direction close to a first radial direction from a line of sight direction when a first angle formed by the line of sight direction of a driver of the vehicle and the first radial direction is smaller than a second angle formed by the line of sight direction and a second radial direction.

7. The birds-eye-view image generation device according to claim 1, wherein in the combined birds-eye-view image, a region between the joint line and the first line includes only an image captured by the second imaging device, and a region between the joint line and the second line includes only an image captured by the first imaging device.

8. The birds-eye-view image generation device according to claim 1, wherein the end point is set at a point of the rim of the vehicle image corresponding to a side body of the vehicle.

9. The birds-eye-view image generation method according to claim 6, wherein in the combined birds-eye-view image, a region between the joint line and the first line includes only an image captured by the second imaging device, and a region between the joint line and the second line includes only an image captured by the first imaging device.

10. The birds-eye-view image generation method according to claim 6, wherein the end point is set at a point of the rim of the vehicle image corresponding to a side body of the vehicle.

* * * * *